US010750079B2

(12) United States Patent
Yamazaki et al.

(10) Patent No.: US 10,750,079 B2
(45) Date of Patent: Aug. 18, 2020

(54) FOCUS ADJUSTMENT DEVICE AND FOCUS ADJUSTMENT METHOD

(71) Applicant: Olympus Corporation, Hachioji-shi, Tokyo (JP)

(72) Inventors: Yukie Yamazaki, Tachikawa (JP); Kazumasa Kunugi, Hino (JP); Yoshinobu Omata, Hachiohi (JP); Tetsuo Kikuchi, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/428,948

(22) Filed: May 31, 2019

(65) Prior Publication Data
US 2019/0289219 A1    Sep. 19, 2019

Related U.S. Application Data

(63) Continuation of application No. PCT/JP2017/042898, filed on Nov. 29, 2017.

(30) Foreign Application Priority Data

Dec. 14, 2016   (JP) ................. 2016-242082

(51) Int. Cl.
H04N 5/232      (2006.01)
G03B 13/36      (2006.01)
(Continued)

(52) U.S. Cl.
CPC ......... H04N 5/232122 (2018.08); G02B 7/28 (2013.01); G02B 7/34 (2013.01);
(Continued)

(58) Field of Classification Search
CPC ............................... H04N 5/232122
(Continued)

(56) References Cited

U.S. PATENT DOCUMENTS 5,659,816 A * 8/1997 Uchiyama ........... G02B 7/34
                                                  396/121
8,730,373 B2 * 5/2014 Egawa .............. G02B 7/365
                                                  348/345
(Continued)

FOREIGN PATENT DOCUMENTS

JP    2013-218082 A    10/2013
JP    2015-014802 A     1/2015

Primary Examiner — Anthony J Daniels
(74) Attorney, Agent, or Firm — John C. Pokotylo; Pokotylo Patent Services

(57) ABSTRACT

A focus adjustment device, comprising a processor having a focus region setting section, a focus detection section, a determination section and a control section, wherein the focus detection region setting section sets a first focus detection region, and a second focus detection region, that is contained in the first focus detection region and that is narrower than the first focus detection region, in an imaging region, the control section, when it is determined that that there is not a periodicity-containing subject for the first focus detection region, and it is determined that there is a periodicity-containing subject for the second focus detection region, performs a focus adjustment operation by selecting a phase difference that is closest to a phase difference that has been detected for the first focus detection region, among a plurality of phase differences that have been detected for the second focus detection region.

18 Claims, 23 Drawing Sheets

(51) Int. Cl.
  *G02B 7/34* (2006.01)
  *G02B 7/28* (2006.01)
(52) U.S. Cl.
  CPC ............ *G03B 13/36* (2013.01); *H04N 5/232* (2013.01); *H04N 5/232125* (2018.08); *H04N 5/232127* (2018.08)
(58) Field of Classification Search
  USPC ........................................ 348/345, 349, 350
  See application file for complete search history.

(56) References Cited

U.S. PATENT DOCUMENTS

| | | | | |
|---|---|---|---|---|
| 2015/0092101 | A1* | 4/2015 | Yamazaki | ................ G02B 7/38 348/353 |
| 2015/0130986 | A1* | 5/2015 | Ohnishi | ................ G03B 13/36 348/349 |
| 2016/0065835 | A1* | 3/2016 | Hirose | ................ H04N 5/23212 348/353 |
| 2017/0366736 | A1* | 12/2017 | Takeuchi | ............ H04N 5/23212 |
| 2019/0137732 | A1* | 5/2019 | Sakurabu | ......... H04N 5/232122 |

* cited by examiner

FIG. 3

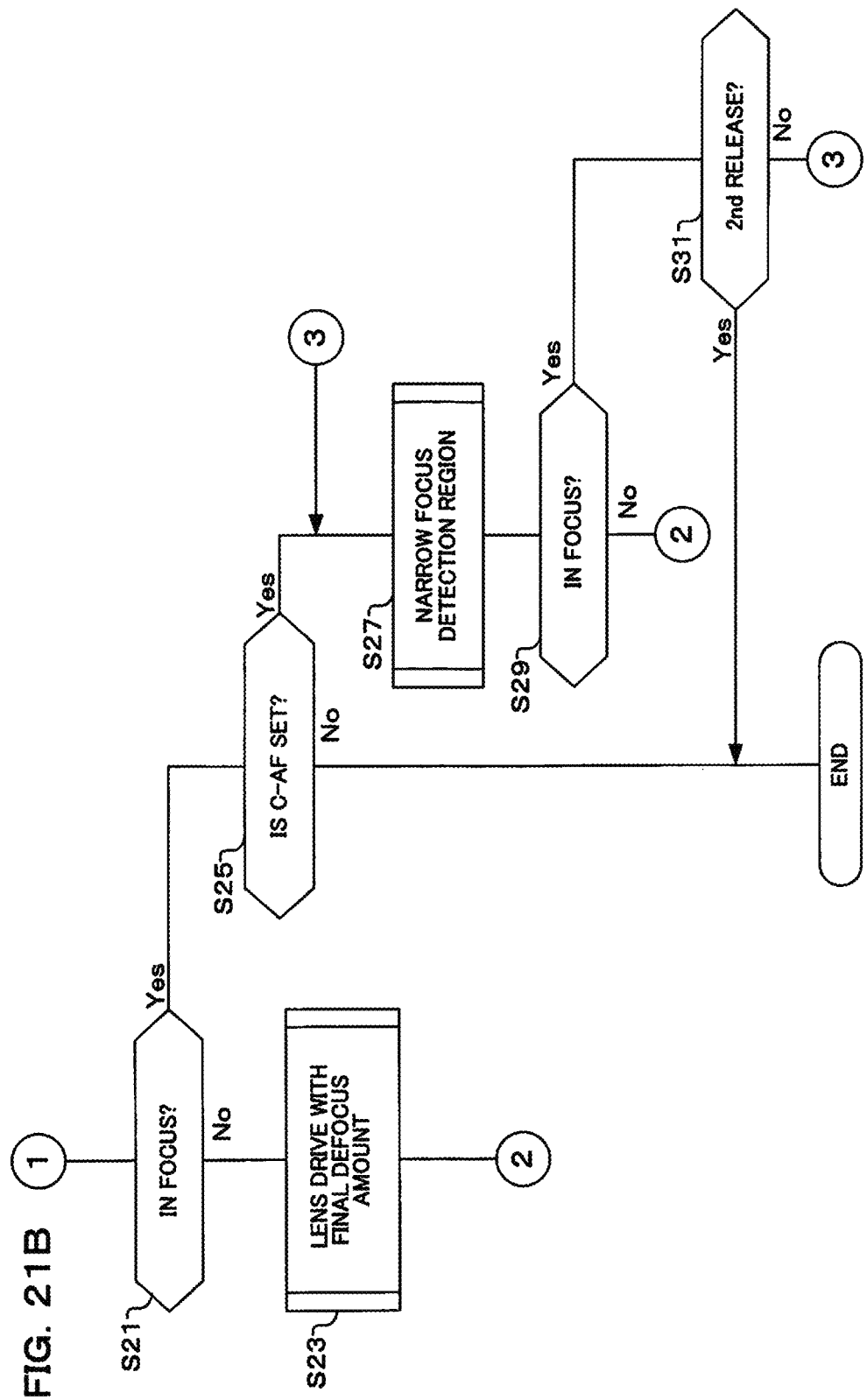

FOCUS ADJUSTMENT DEVICE AND FOCUS ADJUSTMENT METHOD

CROSS-REFERENCE TO RELATED APPLICATIONS

This application is a Continuation Application of PCT Application No. PCT/JP2017/042898, filed on Nov. 29, 2017, and based upon and claiming the benefit of priority from prior Japanese Patent Application No. 2016-242082, filed on Dec. 14, 2016, the entire contents of all of which are incorporated herein by reference.

BACKGROUND OF THE INVENTION

1. Field of the Invention

The present invention relates to a focus adjustment device, having a photographing lens that includes a focus lens, that receives light of a subject image that has been subjected to pupil division by means of this photographing lens and generates image data, and performs focus adjustment based on this image data, and to a focus adjustment method and a storage medium that stores a program.

2. Description of the Related Art

A focus adjustment device of a phase difference AF type that generates image data by receiving light of a subject image that has been subjected to pupil-division by means of a photographing lens, performs correlation calculation using this image data, obtains a phase difference, and drives to an in-focus position, is known. With this phase difference AF method, in the event that there is a periodic pattern in a subject image a plurality of focus candidate points are calculated, it is not possible to detect a true focus target position, and false focusing arises.

The focus detection apparatus described in Japanese patent laid-open No. 2015-014802 (hereafter referred to as "patent publication 1" therefore sets a target direction and target position when driving a photographing lens based on a contrast evaluation value of a taken image. Also, in Japanese patent laid-open No. 2013-218082 (hereafter referred to as "patent publication 2"), an image shift amount is detected for focus detection regions of differing widths, and it is determined whether or not there is false focusing. Specifically, correlation calculation to obtain image shift amount is performed for both the focus detection region, and regions resulting from having divided this focus detection region into specified partial regions. Then, a partial region having the highest reliability with correlation calculation for each partial region is selected, and if a difference between image shift amount Pw of that partial region and image shift amount Ps of a focus detection region is within a specified amount it is determined that there is not false focusing, and focus drive is performed in accordance with defocus amount that has been calculated from the shift amount.

With the focus adjustment device described in patent publication 1, there is a possibility of approaching from a significantly defocused state to close to a focused state after the user has pressed a release button down halfway (called 1st release). However, since it is necessary to perform lens drive from the current focus lens position for each focus candidate point it takes a significant time until focus is attained. Also, in a case where contrast AF is set, if the subject moves while 1st release is being maintained then a contrast evaluation value will also change, and drive of the focus lens must be performed a number of times in order to find a contrast peak again, and selecting a true in-focus position rapidly is difficult.

Also, with the focus adjustment device described in patent publication 2, in a case where a focus detection region has been made wide enough to include a region of substantially all of an image plane, then even if a subject has a repeating pattern there will be a high possibility of a subject having a periodic pattern also being included in the region, and the effect of a periodic pattern will become slight. However, with a focus detection region that has been set extremely wide, a range in which correlation calculation is performed also becomes wide, the scale of an arithmetic circuit increases, and cost increases. Also, computational processing time is prolonged, and it is no longer possible for an AF system to track when performing high speed consecutive shooting. Although it has been considered to perform moving average processing in order to reduce computation amount, in this case if size of a region is reduced an error is included, and precision of image shift amount that is detected becomes bad.

SUMMARY OF THE INVENTION

The present invention provides a focus adjustment device, focus adjustment method and storage medium storing a program that can determine true image shift amount at high speed and reliably focus, even if there is a subject having a periodic pattern.

A focus adjustment device of a first aspect of the present invention generates image data by receiving light of a subject image that has been subjected to pupil division by means of a photographing lens that includes a focus lens and performing photoelectric conversion, and performs a focus adjustment operation based on the image data, the focus adjustment device comprising a processor having a focus region setting section, a focus detection section, a determination section, and a control section, and wherein the focus detection region setting section sets a first focus detection region, and a second focus detection region, that is contained in the first focus detection region and that is narrower than the first focus detection region, in an imaging region, the focus detection section performs phase difference detection based on image data of the first focus detection region or the second focus detection region, the determination section determines whether or not there is a periodicity-containing subject, where the subject has a periodic image pattern, based on the focus detection result, and the control section performs a focus adjustment operation based on phase difference detection results of the focus detection section, and wherein the control section performs respective phase difference detection based on image data of the first focus detection region and image data of the second focus detection region, and if it is determined that that there is not a periodicity-containing subject for the first focus detection region, and it is determined that there is a periodicity-containing subject for the second focus detection region, performs a focus adjustment operation by selecting a phase difference that is closest to a phase difference that has been detected for the first focus detection region, among a plurality of phase differences that have been detected for the second focus detection region.

A focus adjustment method of a second aspect of the present invention is a method that generates image data by receiving light of a subject image that has been subjected to pupil division by means of a photographing lens that includes a focus lens and performing photoelectric conversion, and performs a focus adjustment operation based on the image data, the focus adjustment method comprising, in an imaging region, setting a first focus detection region, and a second focus detection region, that is contained in the first focus detection region, and that is narrower than the first focus detection region, performing phase difference detection based on image data of the first focus detection region or the second focus detection region, determining whether or not there is a periodicity-containing subject, where the subject has a periodic image pattern, based on the focus detection result, and performing respective phase difference detection based on image data of the first focus detection region and image data of the second focus detection region, and if it is determined that that there is not a periodicity-containing subject for the first focus detection region, and it is determined that there is a periodicity-containing subject for the second focus detection region, performing a focus adjustment operation by selecting a phase difference that is closest to a phase difference that has been detected for the first focus detection region, among a plurality of phase differences that have been detected for the second focus detection region.

A storage medium of a third aspect of the present invention stores program code for causing execution of a focus adjustment method on a computer of a focus adjustment device that generates image data by receiving light of a subject image that has been subjected to pupil division by means of a photographing lens that includes a focus lens and performs photoelectric conversion, and performs a focus adjustment operation based on the image data, the focus adjustment method comprising, in an imaging region, setting a first focus detection region, and a second focus detection region, that is contained in the first focus detection region, and that is narrower than the first focus detection region, performing phase difference detection based on image data of the first focus detection region or the second focus detection region, determining whether or not there is a periodicity-containing subject, where the subject has a periodic image pattern, based on the focus detection result, and performing respective phase difference detection based on image data of the first focus detection region and image data of the second focus detection region, and if it is determined that that there is not a periodicity-containing subject for the first focus detection region, and it is determined that there is a periodicity-containing subject for the second focus detection region, performing a focus adjustment operation by selecting a phase difference that is closest to a phase difference that has been detected for the first focus detection region, among a plurality of phase differences that have been detected for the second focus detection region.

BRIEF DESCRIPTION OF THE DRAWINGS

FIG. 3 is a diagram showing arrangement of pixels of an image sensor of a camera of one embodiment of the present invention, the pixels being made up of phase difference AF detection pixels and imaging pixels.

FIG. 21A and FIG. 21B are flowcharts showing operation of the camera of one embodiment of the present invention.

DETAILED DESCRIPTION OF THE PREFERRED EMBODIMENTS

Figure 1:
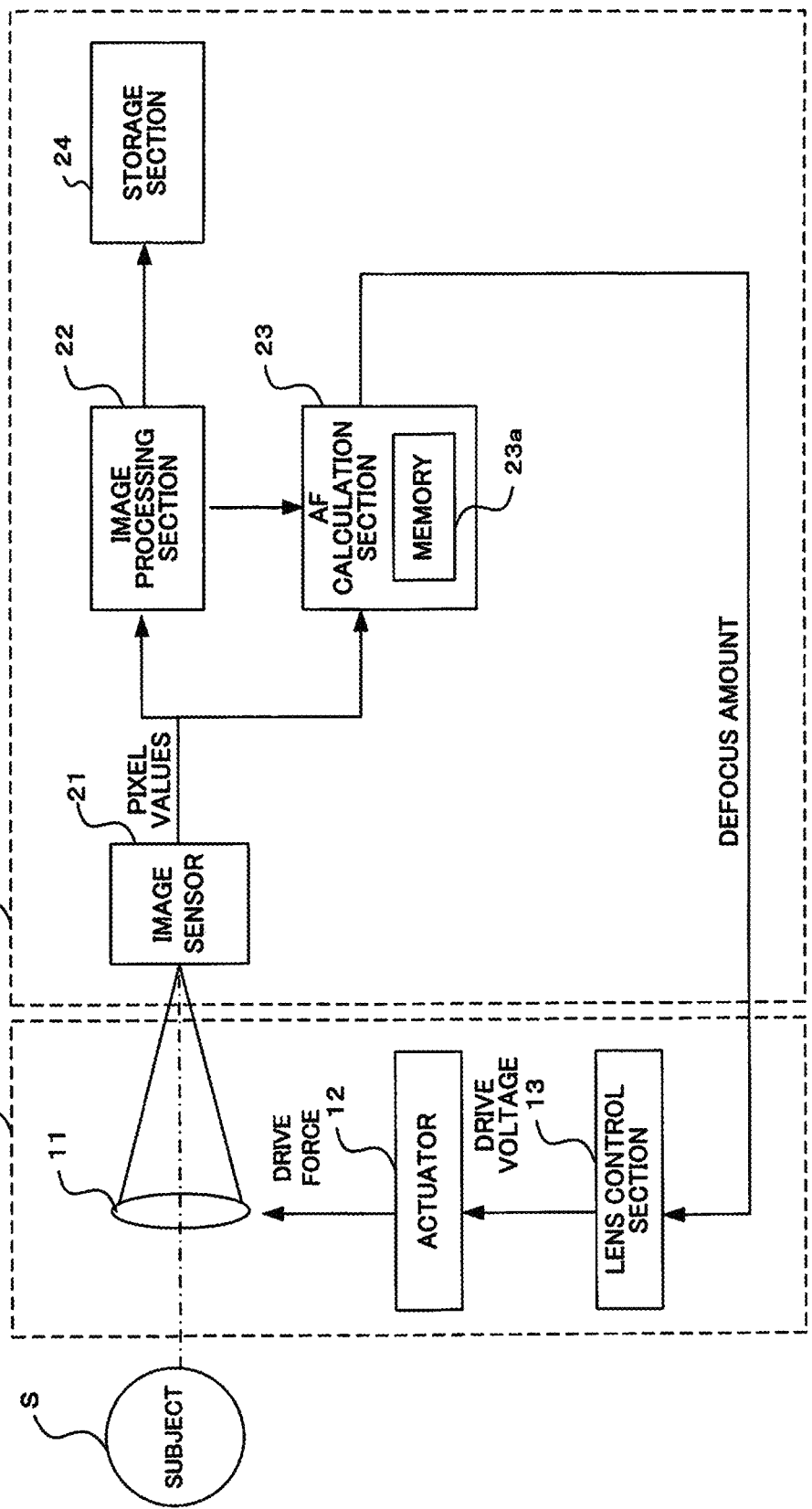
FIG. 1 is a block diagram mainly showing the electrical structure of a camera of one embodiment of the present invention.

A preferred embodiment using a digital camera (hereafter abbreviated to "camera") to which the present invention has been applied will be described in the following in accordance with the drawings. FIG. 1 is a block diagram mainly showing the electrical structure of a camera of one embodiment of the present invention. The camera relating to this embodiment comprises an interchangeable lens barrel 10 and a camera body 20. With this embodiment, the interchangeable lens barrel 10 and a camera body 20 are configured separately, but they may also be constructed integrally, like a general compact camera. Also, the camera of this embodiment receives light of a subject image that has been subjected to pupil division by a photographing lens, that includes a focus lens, subjects the subject image to photoelectric conversion to generate image data, and performs a focus adjustment operation based on the image data (refer to FIG. 3 to FIG. 7).

A photographing lens 11 is arranged inside the interchangeable lens barrel 10. The photographing lens 11 is constituted by a plurality of optical lenses, including a focus lens for forming an optical image of a subject S. An actuator 12 and a lens control section 13 are also provided inside the interchangeable lens barrel 10.

A lens control section 13 has a CPU (Central Processing Unit), peripheral circuits and a memory that stores programs etc. The lens control section 13 receives a defocus amount from an AF calculation section 23 inside the camera body 20, and performs control of the actuator 12 based on these items of information. The actuator 12 moves the focus lens within the photographing lens 11 in the optical axis direction to perform focusing. It should be noted that position of the focus lens is detected using a lens position detection section (not illustrated), and lens position is transmitted by means of a communication section (communication circuit) (not illustrated) to the camera body 20.

An image sensor 21, image processing section 22, AF calculation section 23, and storage section 24 are provided within the camera body 20. The image sensor 21 is arranged on the optical axis of the photographing lens 11, close to a position where a subject image is formed.

The image sensor 21 has a plurality of pixels, and each pixel is provided with a photoelectric conversion section for converting the subject image (optical image) to an electrical signal. A plurality of pixels include phase difference AF detection pixels that have been configured such that incident direction of light flux that is incident on the pixels is restricted (hereafter referred to as "focus detection pixels" or "ranging pixels"), and imaging pixels that have been configured such that light flux that is incident on the pixels is restricted more than for the phase difference AF detection pixels, and the plurality of pixels are arranged two dimensionally. Arrangement of the phase difference AF detection pixels and the imaging pixels of the image sensor 21 will be described later using FIG. 3 and FIG. 4.

The image sensor 21 outputs pixel values that have been output from the phase difference AF detection pixels and the imaging pixels to the image processing section 22 and the AF calculation section 23. The image processing section 22 has an image processing circuit, is input with pixel values from the imaging pixels, among the pixel values, and performs image processing for a live view display image and for a storage image. The image processing section 22 also outputs image data, that has been processed for storage, to the storage section 24.

The storage section 24 is an electrically rewritable non-volatile memory, to which image data for storage is input and stored. The image processing section 22 also detects a face of a subject using pixel values and outputs a central coordinate position of this face, and detects organs such as eyes of the face and outputs a specified coordinate position of this organ. The image processing section 22 also performs subject tracking using pixel values.

The AF calculation section 23 has a CPU (Central Processing Unit), peripheral circuits (including a focus detection circuit), and a memory 23a that stores programs etc. The AF calculation section 23 is input with pixel values from the phase difference AF detection pixels, among pixel values, and carries out AF calculation based on phase difference AF. At the time of AF calculation, a ranging area corresponding to position of the phase difference AF detection pixels is based on central coordinate position and specified coordinate position that have been acquired from the image processing section 22, and defocus amount and contrast evaluation value are calculated for this ranging area that has been set. The focus lens within the photographing lens 11 is driven to an in focus position based on this defocus amount and contrast evaluation value that have been calculated. Also, in a case where the subject image has a periodic pattern, the AF calculation section 23 performs selection of an extreme value for degree of correlation in order to calculate defocus amount so that it is possible to drive to a true in focus position.

Figure 21A:
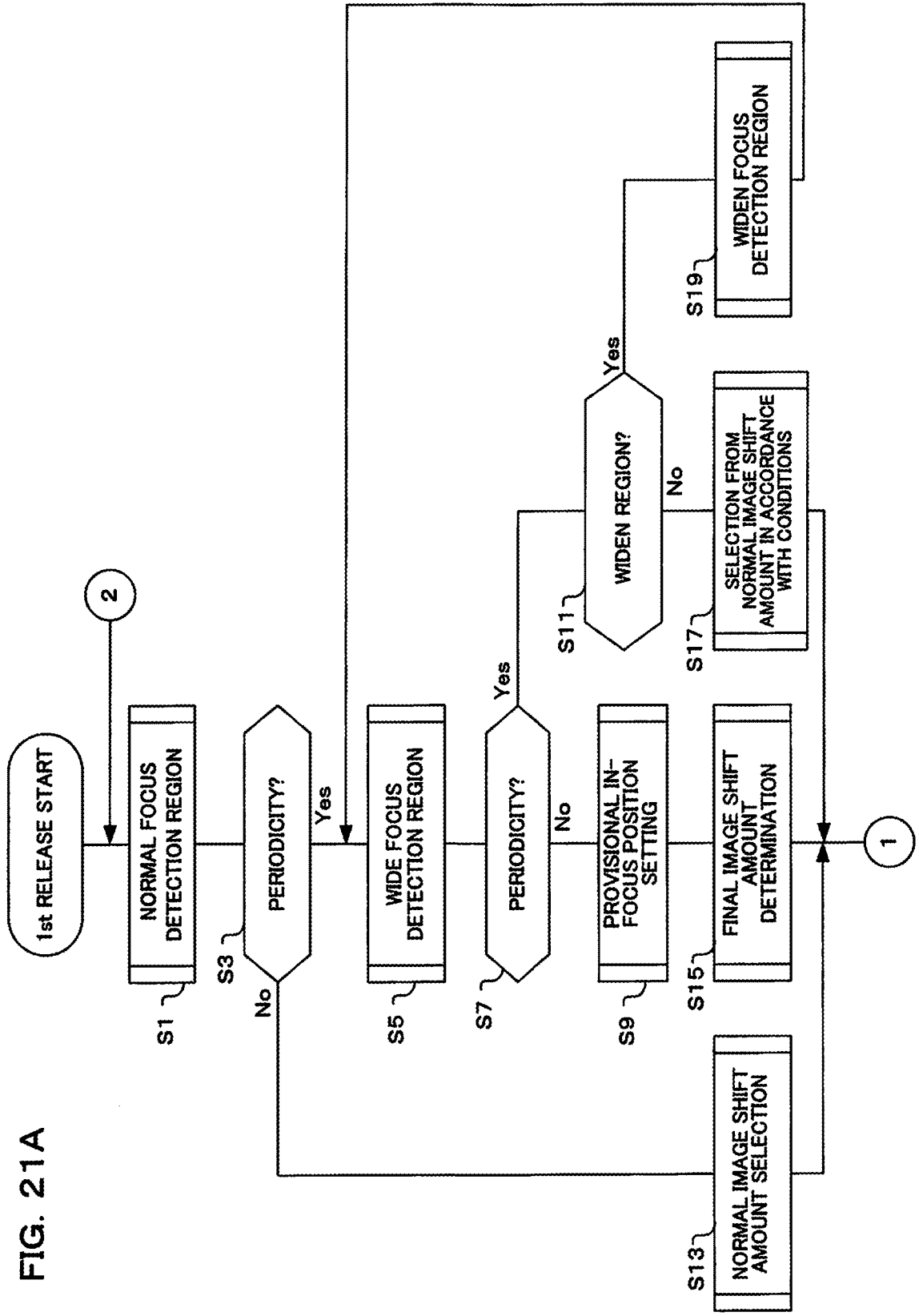

The AF calculation section 23 functions as a control section that performs a focus adjustment operation based on phase difference detection results of a focus detection section (refer, for example, to S23 in FIG. 21B). This control section performs respective phase difference detection based on image data of the first focus detection region (for example, a focus detection region x1 in FIG. 9) and image data of the second focus detection region (for example, a focus detection region x2 in FIG. 9), and if it is determined that that there is not a periodicity-containing subject for the first focus detection region, and it is determined that there is a periodicity-containing subject for the second focus detection region (for example, S3 Yes→S5→S7 No in FIG. 21A), performs a focus adjustment operation by selecting a phase difference that is closest to a phase difference that has been detected for the first focus detection region, among a plurality of phase differences that have been detected for the second focus detection region (refer, for example, to FIG. 15, and S9 and S15 in FIG. 21A).

Figure 19:
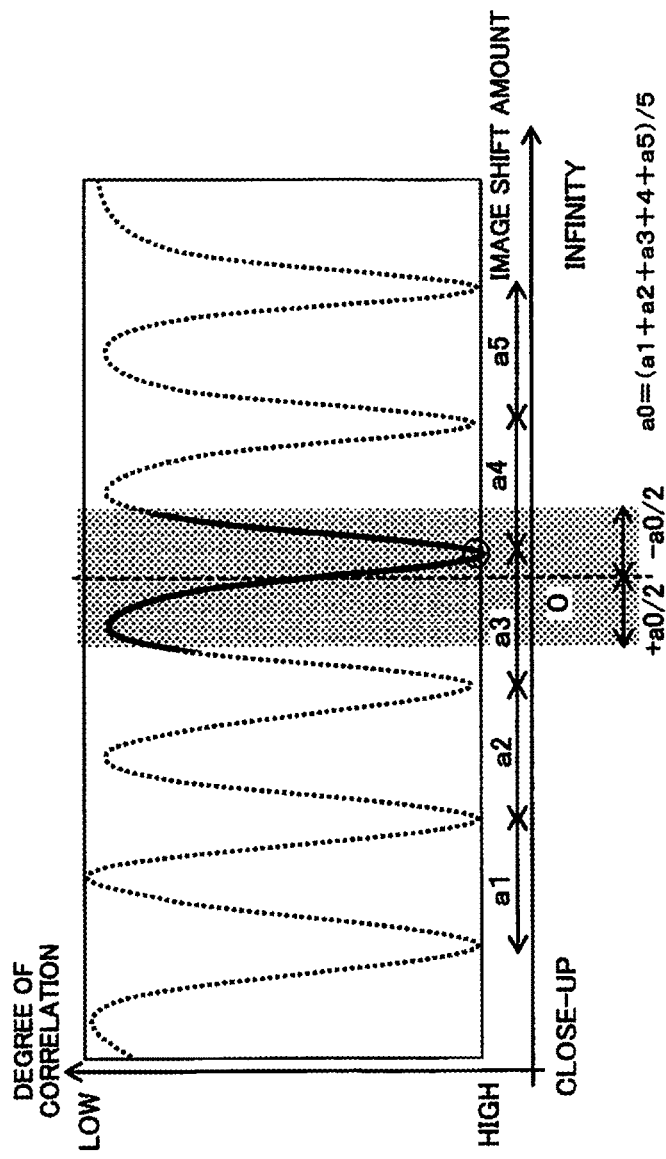
FIG. 19 is a graph showing image shift amount calculation results for a narrow focus detection region (x3), in the camera of one embodiment of the present invention.

Also, after the control section has performed a focus adjustment operation by selecting a phase difference, among a plurality of phase differences that have been detected in the second focus detection region, that is closest to a phase difference that was detected in the first focus detection region, phase difference detection is executed by focus detection section limiting a detection range for phase difference detection from in focus to within a specified range based on image data of the second focus detection region (refer, for example, to FIG. 19 and to S27 in FIG. 21B).

Also, the control section executes phase difference detection based on image data of the first focus detection region if it has been determined, regarding phase difference detection based on image data of the second focus detection region, that detection is not possible (for example, S29 No in FIG. 21B→S1 in FIG. 21A). The control section also performs phase difference detection based on image data of the first focus detection region, and if a periodicity-containing subject has been determined (for example, S5→S7 in FIG. 21A), then phase difference detection is performed by setting a detection range for phase difference detection based on an interval between a plurality of phase differences that have been detected in the second focus detection region (refer, for example, to FIG. 19 and S27 in FIG. 21B).

Figure 2:
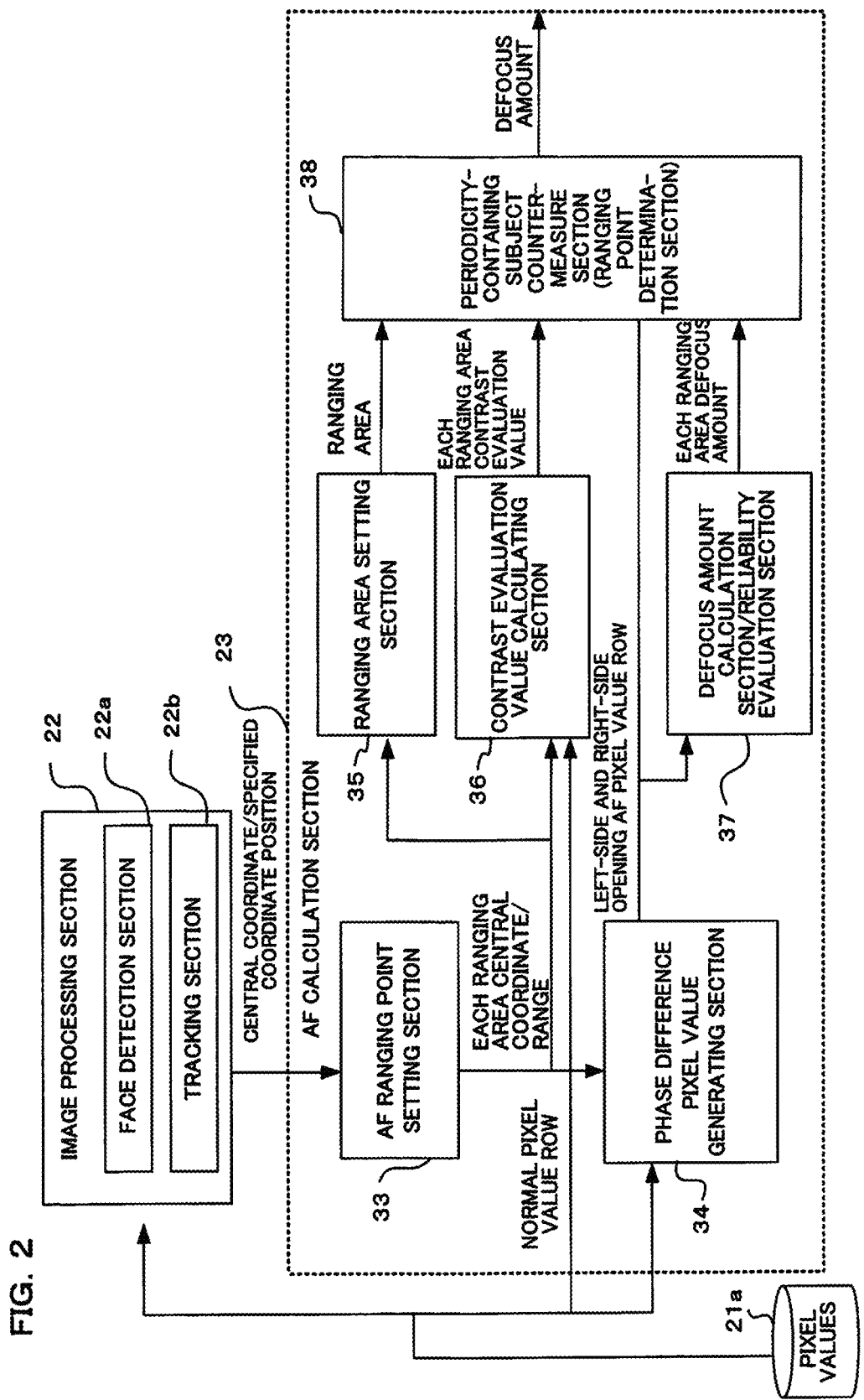
FIG. 2 is a block diagram showing detail of an AF calculation section of a camera of one embodiment of the present invention.

Next, details of the AF calculation section 23 will be described using FIG. 2. The AF calculation section 23 comprises respective sections such as an AF range point setting section 33, phase difference pixel generating section 34, ranging area setting section 35, contrast evaluation value calculation section 36, defocus amount calculating section/ reliability evaluation section 37, and periodicity-containing subject countermeasure section 38, and functions of these sections are executed using the previously described CPU (Central Processing Unit), peripheral circuits (including a focus detection circuit), and memory 23a that stores programs. The pixel values in FIG. 2 are pixel values that have been output from the image sensor 21, and are temporarily stored in memory 21a, such as SDRAM (Synchronous Dynamic Random Access Memory).

A face detection section 22a, having a face detection circuit, is also provided within the image processing section 22. This face detection section 22a determines whether or not there is a face within the subject image based on pixel values of imaging pixels from the image sensor 21, and if a face is contained in the subject image detects the position (central coordinate position) and size etc. of that face. Detection of organs such as the right eye, left eye, nose etc. is also performed, and specified coordinate position of those organs is also detected. Central coordinates and specified coordinate positions that have been detected by the face detection section 22a are output to an AF ranging point setting section 33 within the AF calculation section 23.

A tracking section 22b having a tracking circuit is also provided within the image processing section 22. This tracking section 22b performs tracking of a subject based on pixel values of imaging pixels from the image sensor 21. For example, for position of a face that has been detected by the face detection section 22a or position of a subject that has been designated by the photographer, every time pixel values are output from the image sensor 21 it is detected where the same subject has moved to by comparing pixel values, and tracking is performed using this detected movement. Central coordinate and specified coordinate positions within a tracked object that has been detected by the tracking section 22b are output to an AF ranging point setting section 33 within the AF calculation section 23.

The AF ranging point setting section 33 sets ranging point corresponding to central coordinate position and specified coordinate position based on central coordinate position and specified coordinate position that have been detected by the face detection section 22a or the tracking section 22b. The image sensor 21 is divided into a plurality of ranging points, ranging points that are close to the central coordinate position and specified coordinate position are set from among the plurality of ranging points, and a central coordinate of each ranging point that has been set is output to a ranging area setting section 35 and a contrast evaluation value calculation section 36. It should be noted that ranging points can also be set manually by the user.

A phase difference pixel value generating section 34 is input with image data of phase difference AF detection pixels, within the pixel values 21a, and generates a pixel row for phase difference AF detection, outputting this pixel value row to a defocus amount calculating section/reliability evaluation section 37 and a periodicity-containing subject countermeasure section 38 (also called ranging point determination section).

The defocus amount calculating section/reliability evaluation section 37 is input with image data of the pixel row for phase difference AF detection, calculates a defocus amount using a phase difference AF method, and outputs a defocus amount for each ranging area to the periodicity-containing subject countermeasure section 38. The defocus amount calculating section/reliability evaluation section 37 functions as a phase difference detection section that detects extreme values having a high degree of correlation based on image data. The calculation of defocus amount and the determination of reliability using phase difference AF will be described later using FIG. 5 to FIG. 7. The defocus amount calculating section/reliability evaluation section 37 functions as a focus detection section that performs phase difference detection based on image data of the first focus detection region or the second focus detection region.

The ranging area setting section 35 is input with central coordinates of each ranging area from the AF ranging point setting section 33, sets ranging areas (focus detection regions), and outputs the set ranging areas to the periodicity-containing subject countermeasure section 38. The ranging area setting section 35 functions as a focus region setting section that sets a first focus detection region and a plurality of second focus detection regions, that are contained in the first focus detection region and are narrower than the first focus detection region, in an imaging region (refer to the wide focus detection region x1, the normal focus detection region x2 in FIG. 9, and S1 and S5 in FIG. 21A).

The contrast evaluation value calculation section 36 is input with pixel values from imaging pixels from the pixel values 21a, and is also input with central coordinates of each ranging area from the AF ranging point setting section 33. Calculation of contrast evaluation value is performed using this information, and contrast evaluation value for each ranging area is output to the periodicity-containing subject countermeasure section 38. Since this contrast evaluation value is calculated using pixel values from the imaging pixels, a longer calculation time is required but it is possible to obtain contrast evaluation value of higher precision.

The periodicity-containing subject countermeasure section 38 is input with ranging areas, a contrast evaluation value for each ranging area, defocus amount of each ranging area, and left and right-side opening AF pixel value rows, as was described previously, and calculates defocus amount for the ranging areas that have been set so that an appropriate focused point is acquired even for a periodic subject. The periodicity-containing subject countermeasure section 38 functions as a periodicity-containing subject determination section that determines a periodicity-containing subject when a plurality of extreme values of high degree of correlation are detected by the phase difference detection section. The periodicity-containing subject countermeasures of this embodiment will be described later using FIG. 8A to FIG. 21B. The periodicity-containing subject countermeasure section 38 functions as a determination section that determines whether or not a subject is a periodicity-containing subject that has a periodic image pattern, based on focus detection results (refer to FIG. 8A, FIG. 8B, and S3 and S7 in FIG. 21A).

Figure 3:
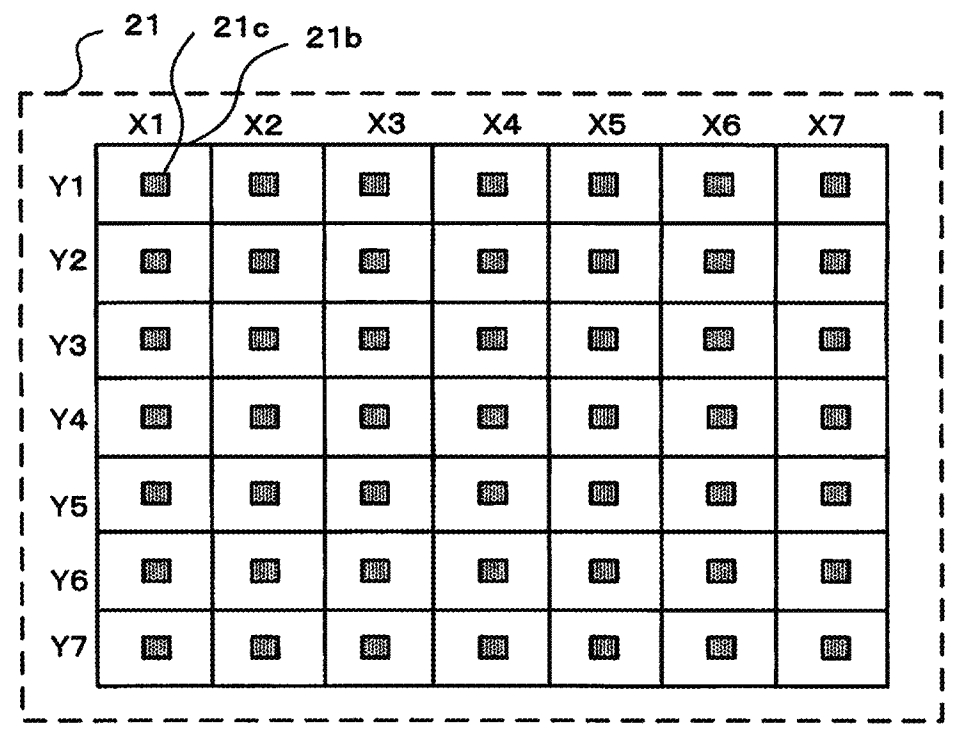

Next, the image sensor 21 and the ranging areas will be described using FIG. 3 and FIG. 4. With the example shown in FIG. 3, the image sensor 21 is divided in the column direction into X1-X7 and in the row direction into Y1-Y7, and each of these 49 areas constitutes a ranging area. The area shown by reference numeral 21b is represented as (X1, Y1). A center point 21c of each ranging area of each area is made a center coordinate of the ranging area.

Figure 4:
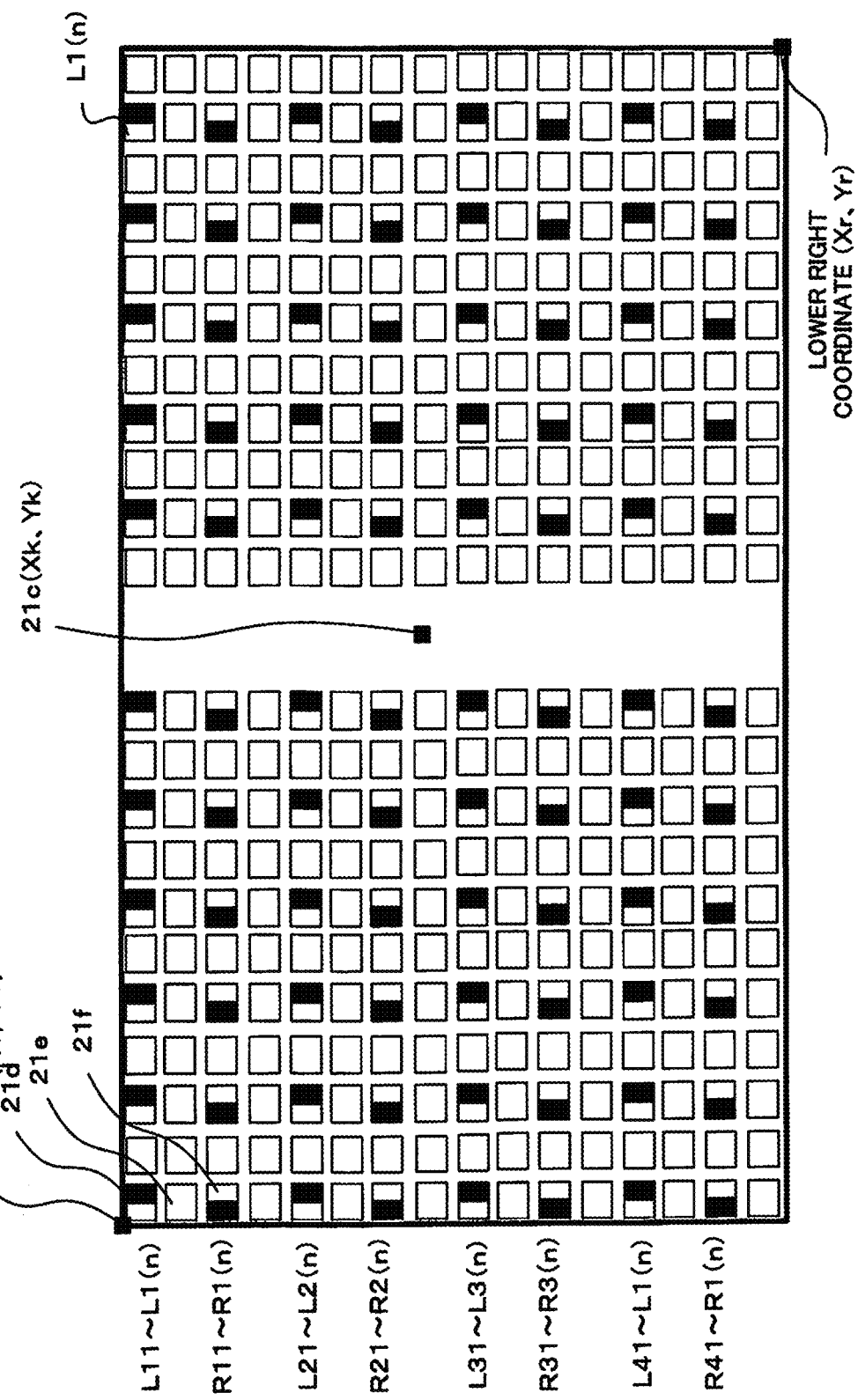
FIG. 4 is an enlarged diagram of one ranging area of an image sensor of a camera of one embodiment of the present invention.

FIG. 4 shows an arrangement example of pixels of a single ranging area. The inside of each ranging area shown in FIG. 3 is made up of phase difference AF detection pixels and imaging pixels, as shown in FIG. 4. In FIG. 4 a rectangle represents a single pixel. Pixels that have the left side or right side of the rectangle filled in black are phase difference AF detection pixels, while pixels that do not have any parts within the rectangle filled are imaging pixels.

Within the ranging areas shown in FIG. 4, left-side opening phase difference AF detection pixels 21d, imaging pixels 21e and right-side opening phase difference AF pixels 21f are arranged alternately. Typically, with the column furthest to the left, L11, L21, L31 and L41 are left-side opening phase difference AF pixels 21d, R11, R21, R31 and R41 are right-side opening phase difference AF pixels 21f, and imaging pixels 21e are arranged between these phase difference AF pixels. The second column in from the left has only imaging pixels 21e. After that, columns containing phase difference AF detection pixels and columns made up of only imaging pixels are repeatedly arranged alternately.

It should be noted that with this embodiment, columns that include phase difference AF detection pixels and columns that are made up of only imaging pixels are alternatively arranged on every other column, but it is also possible to have two or more columns that are made up of only imaging pixels between one column that includes phase difference AF detection pixels and another column that includes phase difference AF detection pixels.

The phase difference pixel value generating section 34 (refer to FIG. 2) calculates average value of pixel values of left-side opening AF detection pixels, or average value of pixel values of right-side opening AF detection pixels, for every AF pixel value, to generate an AF pixel value row. With this embodiment, since each AF pixel value constitutes an average value of pixel values for four pixels, pixel values of left-side opening AF detection pixels or pixel values of right-side opening AF detection pixels are first subjected to four-pixel addition for each AF pixel value, and then divided by four. Specifically, average values are derived using the following calculations.

left-side opening AF pixel value row:

$$L1=(L11+L21+L31+L41)/4$$

$$L2=(L12+L22+L32+L42)/4$$

$$L3=(L13+L23+L33+L43)/4$$

$$Ln=(L1(n)+L2(n)+L3(n)+L4(n))/4$$

right-side opening AF pixel value row:

$$R1=(R11+R21+R31+R41)/4$$

$$R2=(R12+R22+R32+R42)/4$$

$$R3=(R13+R23+R33+R43)/4$$

$$Rn=(R1(n)+R2(n)+R3(n)+R4(n))/4$$

Also, with the example shown in FIG. 4, an upper left coordinate is $(X1, Y1)$, a lower right coordinate is $(Xr, Yr)$, and a center coordinate 21c of the ranging area is $(Xk, Yk)$. The center coordinates $(Xc[k], Yc[k])$ of the ranging area constitute a position where an arbitrary length $(a[k], b[k])$ (with this embodiment k=1 to 7) has been added to a face center coordinate/specified coordinate $(Xco, Yco)$, for every respective ranging area, and so become:

$$Xc[k]=Xco+a[k], Yc[k]=Yco+b[k].$$

It should be noted that k is a number of the ranging area, and k=0, 1, 2, . . . , Area_num−1 (Area_num: number of ranging areas) are set.

Figure 5:
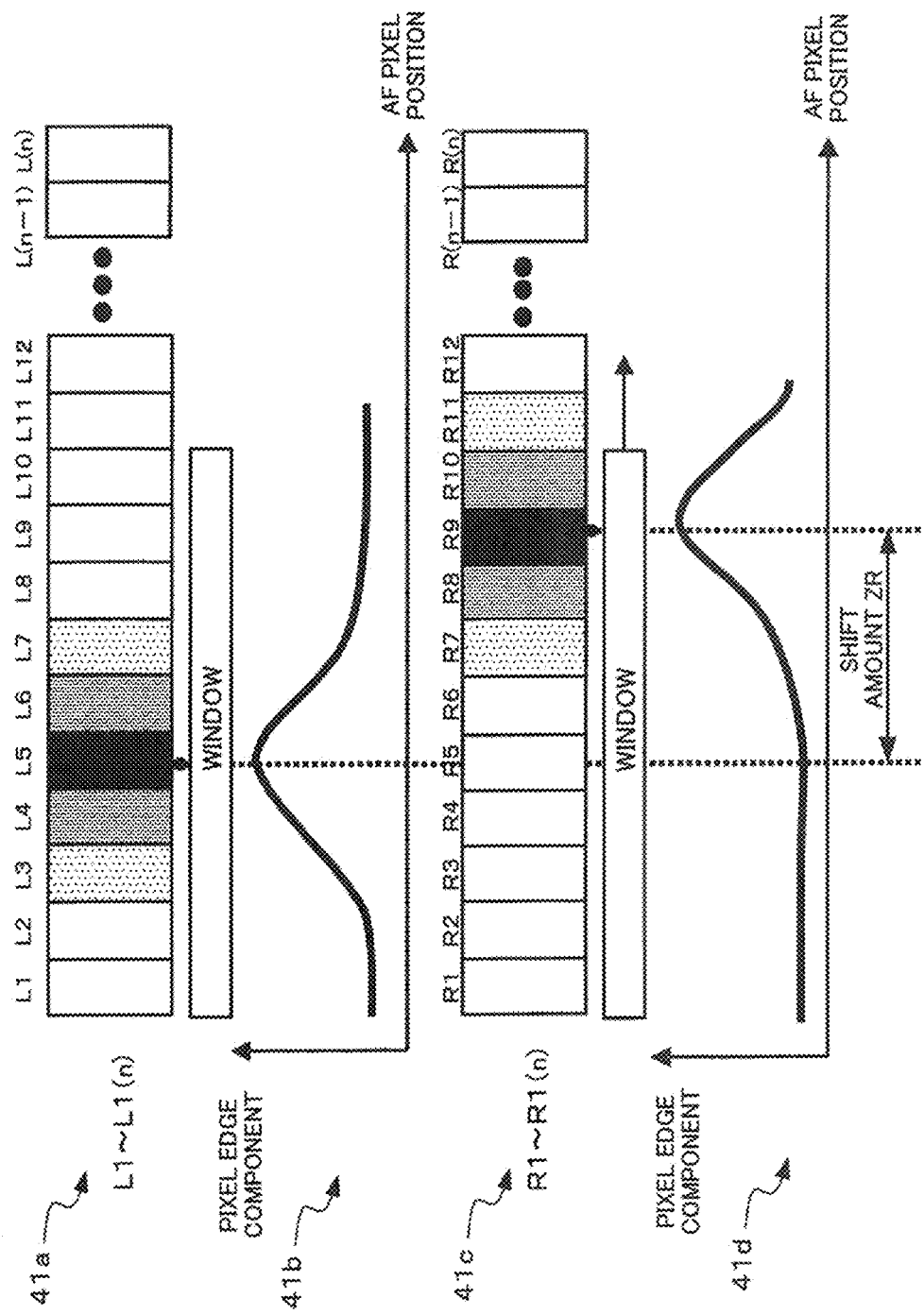
FIG. 5 is a diagram for explaining a ranging method in a camera of one embodiment of the present invention.
Figure 6:
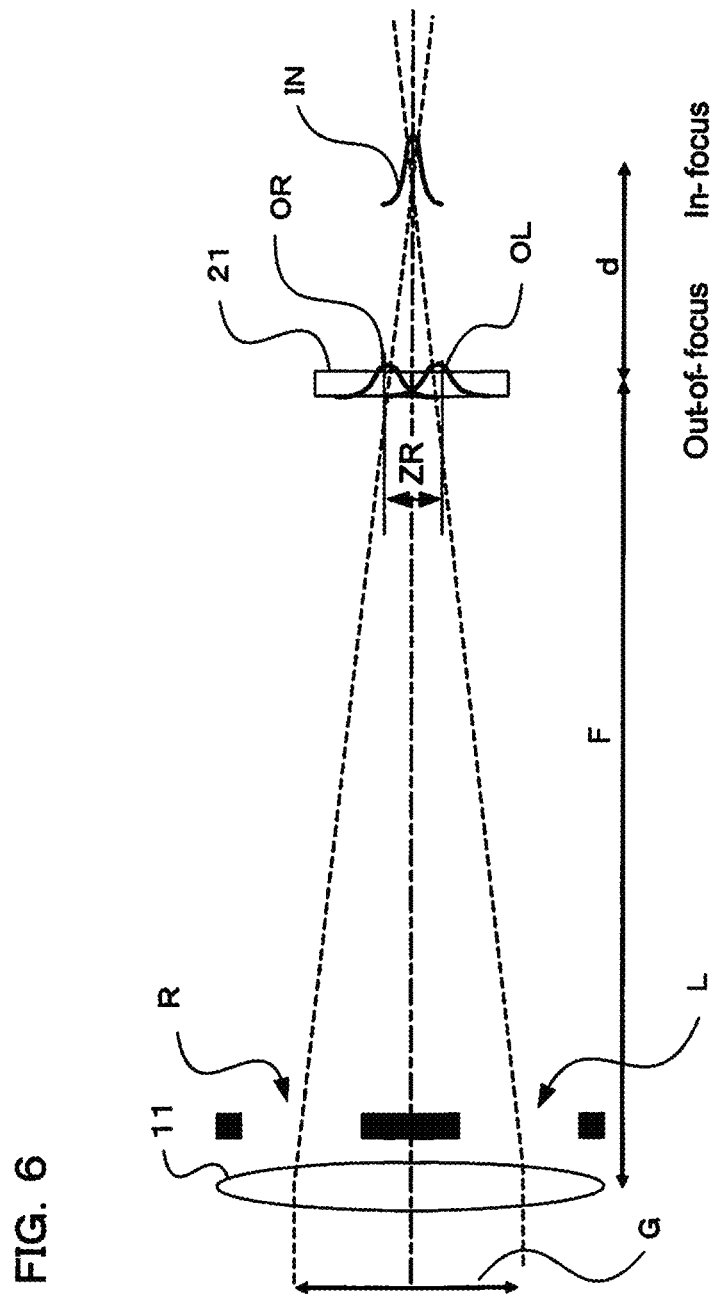
FIG. 6 is a diagram for explaining a ranging method in a camera of one embodiment of the present invention.
Figure 7:
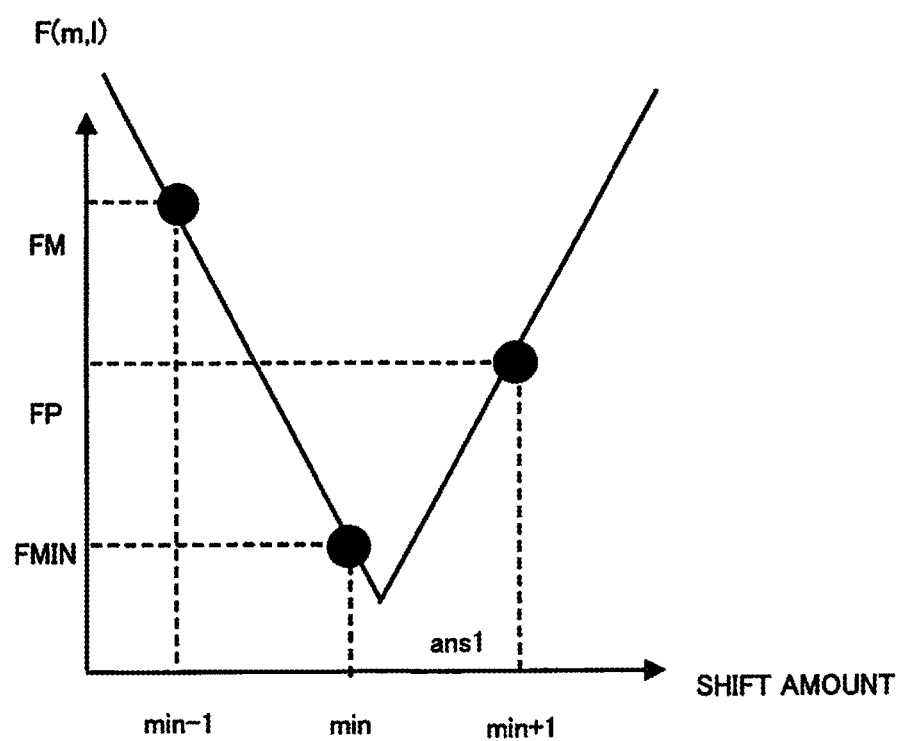
FIG. 7 is a graph showing correlation calculation results, in the camera of one embodiment of the present invention.

The defocus amount calculating section/reliability evaluation section 37 adds and subtracts $(c[k], d[k])$ from center of a ranging area $(Xc[k], Yc[k])$ ($c[k], d[k]$ are predetermined numerical values for every area, and x and y direction ranges for correlation calculation), defines upper left coordinates $(X1[k], Y1[k])=(Xc[k]-c[k], Yc[k]-d[k])$ and lower right coordinates $(Xr[k], Yr[k])=(Xc[k]+c[k], Yc[k]+d[k])$, and within that range performs calculation to obtain defocus amount based on phase difference AF that will be explained using FIG. 5 to FIG. 7.

FIG. 6 is a drawing showing ranging principle for phase difference AF. Right-side openings R and left-side openings L are provided within the light flux of the photographing lens 11, an image OR that is equivalent to pixel output based on light flux of only the right-side openings R on the image sensor 21 is compared with an image OL that is equivalent to pixel output based on light flux of only the left-side openings L on the image sensor, and in the event that focus is not achieved both images OR and OL are displaced by a shift amount ZR. Also, at an in focus position that is defocus amount d away, both images IN coincide. Accordingly, shift amount ZR is obtained, defocus amount d is obtained based on shift amount ZR, and the photographing lens 11 may be moved to an in focus position based on defocus amount d. It should be noted that reference numeral G in FIG. 6 shows distance between centroids of left-side and right-side openings, and reference numeral F represents distance from an image plane to a pupil.

The AF pixel arrangement 41a and graph 41b in FIG. 5 show pixel values (pixel edge components) corresponding to arrangement positions of left-side opening AF pixel value rows L1 to L(n) (corresponding to image OL in FIG. 6). Also, the AF pixel arrangement 41c and graph 41d in FIG. 5 show pixel values (pixel edge components) corresponding to arrangement positions of right-side opening AF pixel value rows R1 toRL(n) (corresponding to image OR in FIG. 6). These pixel values are used to obtain correlation of subject images that have been projected onto left-side and right-side opening pixel columns. Difference between AF pixel positions where shape of a subject image is extremely similar constitutes shift amount (parallax error) ZR.

Regarding shift amount, for example, a window that corresponds to a left-side opening pixel value row is fixed, a window corresponding to a right-side opening pixel value row is moved one pixel at a time, and then, if movement for the window corresponding to the right-side opening pixel value row has been completed, a window corresponding to a right-side opening pixel value row is fixed and a window corresponding to a left-side opening pixel value row is moved one pixel at a time. An evaluation value Fm is obtained from a cumulative value for difference between left-side opening AF pixel values and right-side opening AF pixels within a window at this time. A shift amount when this evaluation value Fm becomes a minimum value is shift amount ZR.

FIG. 7 is a graph showing position and Fm of AF pixels close to where evaluation value Fm becomes a minimum value. In this graph, where position of the AF pixels is min, evaluation value Fm becomes a minimum. Here, since evaluation value Fm is discrete data, interpolation processing is performed using a plurality of items of evaluation values Fm in the vicinity of the minimum value, and a true minimum value is obtained to calculate shift amount ZR.

Once shift amount ZR has been obtained, defocus amount d can be calculated from shift amount ZR using equation (1) below. Specifically, from the relationship that was shown in FIG. 6, $$G:ZR=F+d:d$$

$$(F+d)*ZR-dG=0$$

$$d=F*ZR/(G-ZR) \quad (1)$$

Here,
d: defocus amount
F: distance from image sensor to pupil
ZR: shift amount
G: distance between centroids of left-side and right-side openings The defocus amount calculating section/reliability evaluation section 37 uses degree of correlation inclination Fs of the evaluation value Fm as a phase difference AF reliability value. Specifically, with the example showing in FIG. 7, inclination Fs[k] of a straight line that passes through a minimum value of evaluation value Fm (FMIN) and the larger evaluation value FM of two items of Fm before and after this minimum value is calculated as an evaluation value representing reliability, and output. A minimum value ans1 that has been approximated at inclination Fs[k] represents a shift amount at which correlation between two images of the left-side opening and the right-side opening become highest, and this value is made a two images intermediate value. By substituting shift amount ans1 for ZR in equation (1) above, defocus amount d is calculated.

Figure 8A:
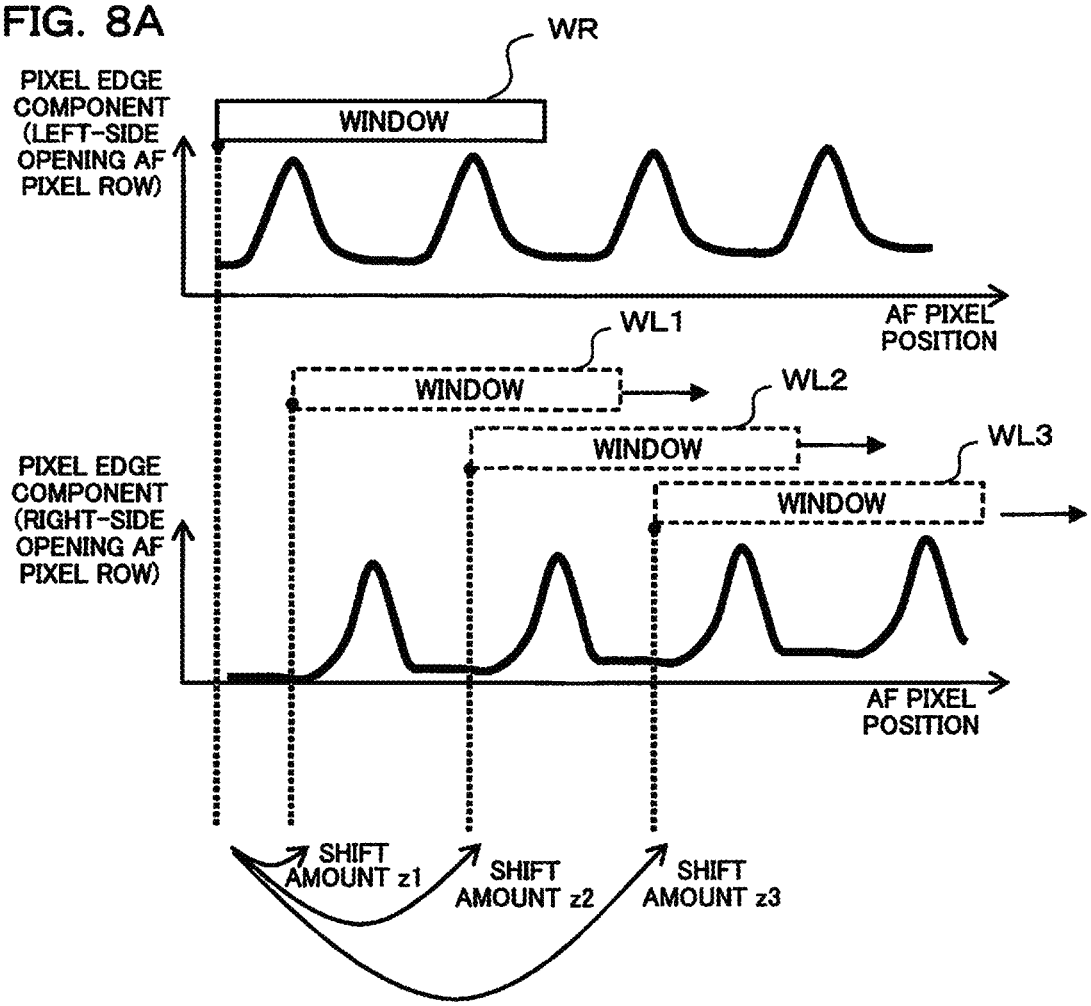
FIG. 8A and FIG. 8B are drawings showing a correlation calculation method, and correlation calculation results, in a case of ranging of a periodicity-containing subject in the camera of one embodiment of the present invention.

Next, a case where a periodicity-containing subject has been ranged using a phase difference AF method will be described using FIG. 8A and FIG. 8B. FIG. 8A shows one example of pixel edge components (pixel output) of a periodicity-containing subject. In FIG. 8A, the upper graph has AF pixel position on the horizontal axis and shows change in pixel edge components of a left-side opening AF pixel value row on the vertical axis. Also, the lower graph has AF pixel position on the horizontal axis and shows change in pixel edge components of a right-side opening AF pixel value row on the vertical axis.

Since there is a periodicity-containing subject, the right-side opening AF pixel value row and the left-side opening pixel value row both have pixel edge components of the same periodic pattern. Therefore, as shown in FIG. 8A, a window WR for the left-side opening AF pixel value row is fixed, and if correlation calculation is performed with window WL1 for the right-side opening AF pixel value row a shift amount becomes z1, performing correlation calculation with window WL2 gives a shift amount of z2, and performing correlation calculation with window WL3 gives a shift amount z3.

Figure 8B:
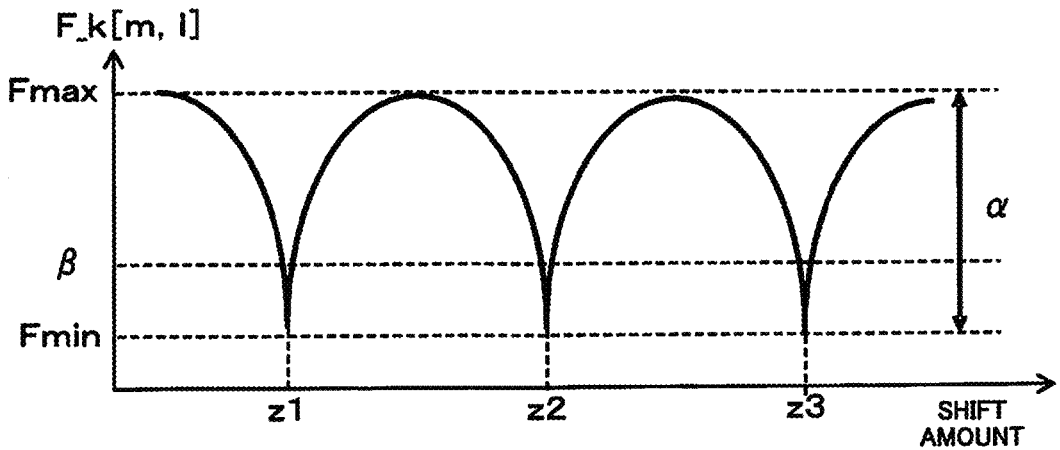

As shown in FIG. 8A, if evaluation value is obtained while sequentially moving from window WL1-WL3, then evaluation value becomes a minimum value in the order shift amount z1, z2, z3, as shown in FIG. 8B. If a plurality of minimum values are detected in this way, it is not possible to determine which is a true minimum value (specifically, a shift amount corresponding to a true focus point), and phase difference AF method ranging becomes difficult. With this embodiment, therefore, in the case where it has been detected that there is a periodicity-containing subject, an algorithm is executed in order to find a true minimum value. It is therefore first detected whether or not there is a periodicity-containing subject.

A detection method for a periodicity-containing subject of this embodiment is performed based on the following three points (A1)-(A3).
(A1) Total number of minimum values of evaluation value representing degree of correlation (is 2 or more)
A2) Difference between maximum value Fmax and the minimum value Fmin for evaluation value representing degree of correlation is threshold value α or greater
(A3) Minimum value for evaluation value representing degree of correlation is less than threshold value β

With this embodiment, a periodicity-containing subject is determined in the event that all of the above conditions (A1)-(A3) have been satisfied, but it is also possible to omit some of these conditions, or to add other conditions. Also, the threshold values α and β may be fixed values that have been designated in advance, or may be designated externally, or may be capable of being changed depending on other factors.

Next, a method of detecting a true in-focus position that is performed when a periodic subject has been detected will be described using FIG. 9 to FIG. 21B.

Figure 9:
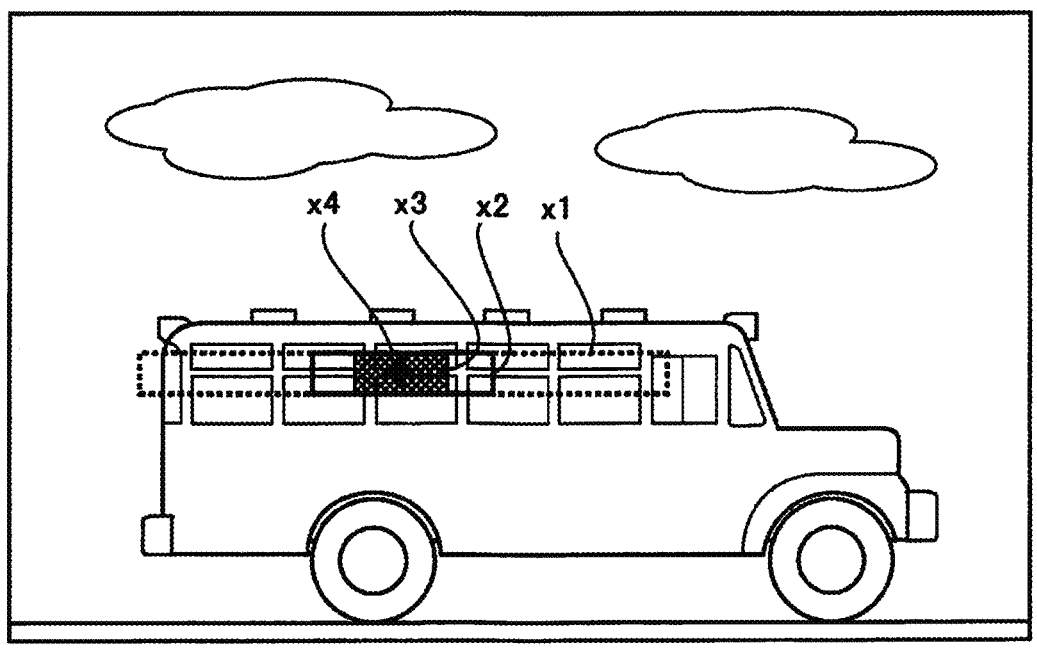
FIG. 9 is a drawing a subject with a focus detection region projected thereon, in the camera of one embodiment of the present invention.

FIG. 9 shows a focus detection region that has been projected onto the side of a subject. In FIG. 9, x4 is a ranging center, and x1 to x3 show a range of the focus detection region. Focus detection region x1 is the widest among the focus detection regions, while focus detection region x2 within the focus detection region is a normal focus detection region, and focus detection region x3 is a narrow focus detection region. It should be noted that in FIG. 9 only one each of the normal focus detection region x2 and the narrow focus detection region x3 have been set within the wide detection region x1, but in actual fact it is possible to set a plurality of normal focus detection regions x2, and any one of the normal focus detection regions x2 is set based on face detection or manual setting by the user etc. Also, if a normal focus detection region x2 is set, a narrow focus detection region x3 is set within this normal focus detection region x2.

Figure 10:
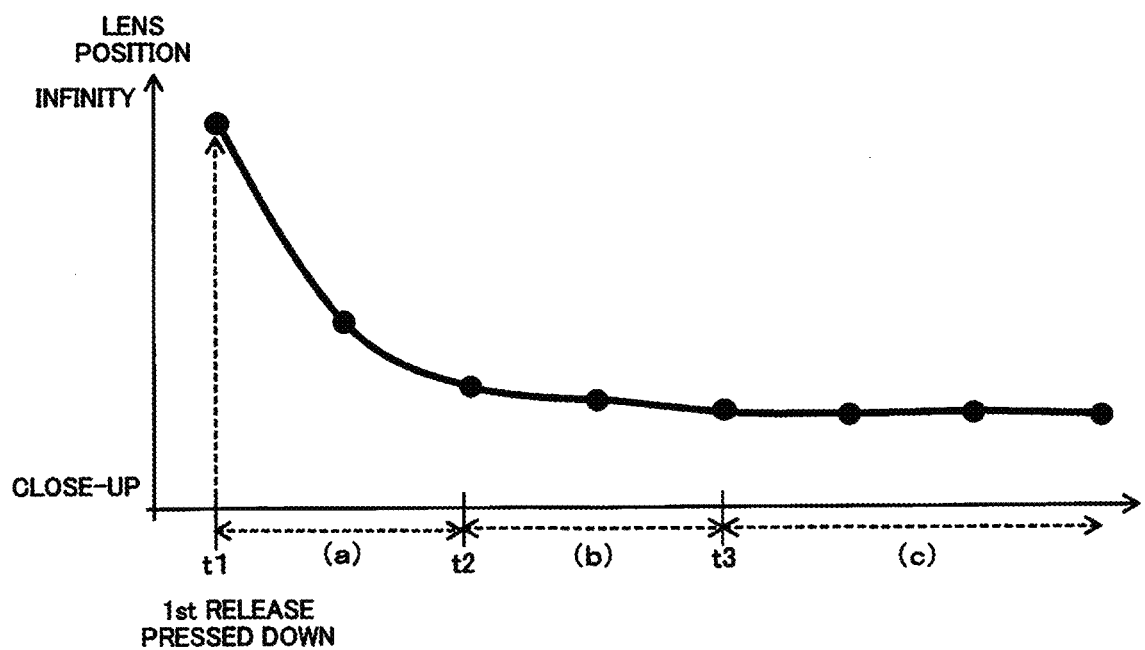
FIG. 10 is a drawing showing a focus lens locus after 1st release, in the camera of one embodiment of the present invention.

If the user presses the release button down halfway (called 1st release), the AF calculation section 23 of the camera performs focus detection, and focus adjustment is performed so as to achieve a focused state. FIG. 10 shows a drive locus of the focus lens from when 1st release is performed until a focused state is achieved.

With the example shown in FIG. 10, if 1st release is performed at time t1 (significantly defocused state of (a), which will be described later), close to in-focus is reached at time t2 (close to in focus state of (b), which will be described later), a focused state is achieved from time t3, and in a state where a 1st release held state is maintained, in the case of C-AF (continuous AF) mode, which will be described later, there is tracking to a focused state (within a focusing range) (focus tracking state of (c) which will be described later). In the following, description will be given for each of states (a) to (c). It should be noted that in the case of S-AF (single AF) mode, and not C-AF mode, movement of the focus lens is stopped at time t3 when focus is achieved.

(a) Significantly Defocused State

There is a time from time t1 when the 1st release has been pressed down half way and time t2, and this period is the significantly defocused state. Immediately after the 1st release has been pressed down, a subject that exists closest (a bus in the example shown in FIG. 9) is approached as a result of calculating image shift amount based on a pixel signal from the phase difference AF detection pixels of the wide focus detection region x1 shown in FIG. 9 (a subject (bus) that is positioned closest is close to in focus at time t2).

Figure 11:
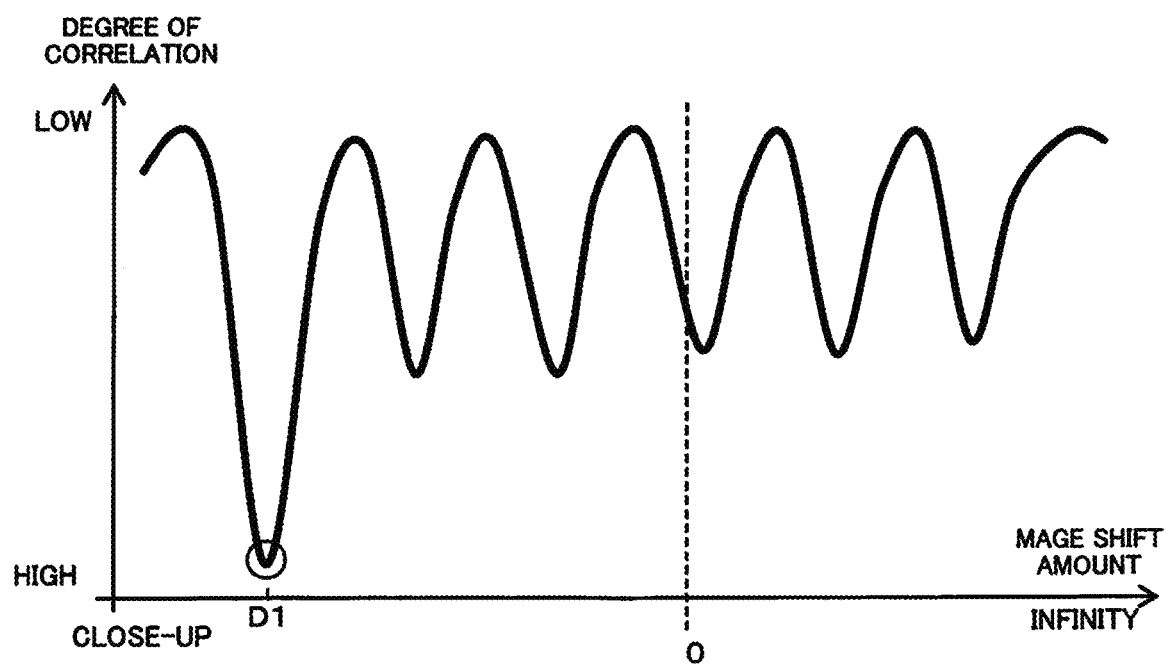
FIG. 11 is a drawing showing image shift amount calculation for a wide focus detection region (x1), in the camera of one embodiment of the present invention.

In FIG. 11 results of image shift amount (defocus amount) calculated in the wide focus detection region x1 are shown. In FIG. 11 the horizontal axis is image shift amount (defocus amount), and the vertical axis is degree of correlation (evaluation value). With the example of the bus shown in FIG. 9, since window jambs have periodicity, the image shift amount also has periodicity, and there are a plurality of image shift amounts having an extreme value of degree of correlation. Among these image shift amounts an image shift amount D1 is a minimum value, and if a focus lens is caused to move in accordance with image shift amount D at this time a close to in focus state will result.

However, on detecting image shift amount D1 the subject may have a periodic pattern in all regions, even for wide focus detection region x1. In this case, it is possible to approach close to in focus by executing focus detection etc. that uses a contrast evaluation value, such as was disclosed in patent publication 1.

Figure 12:
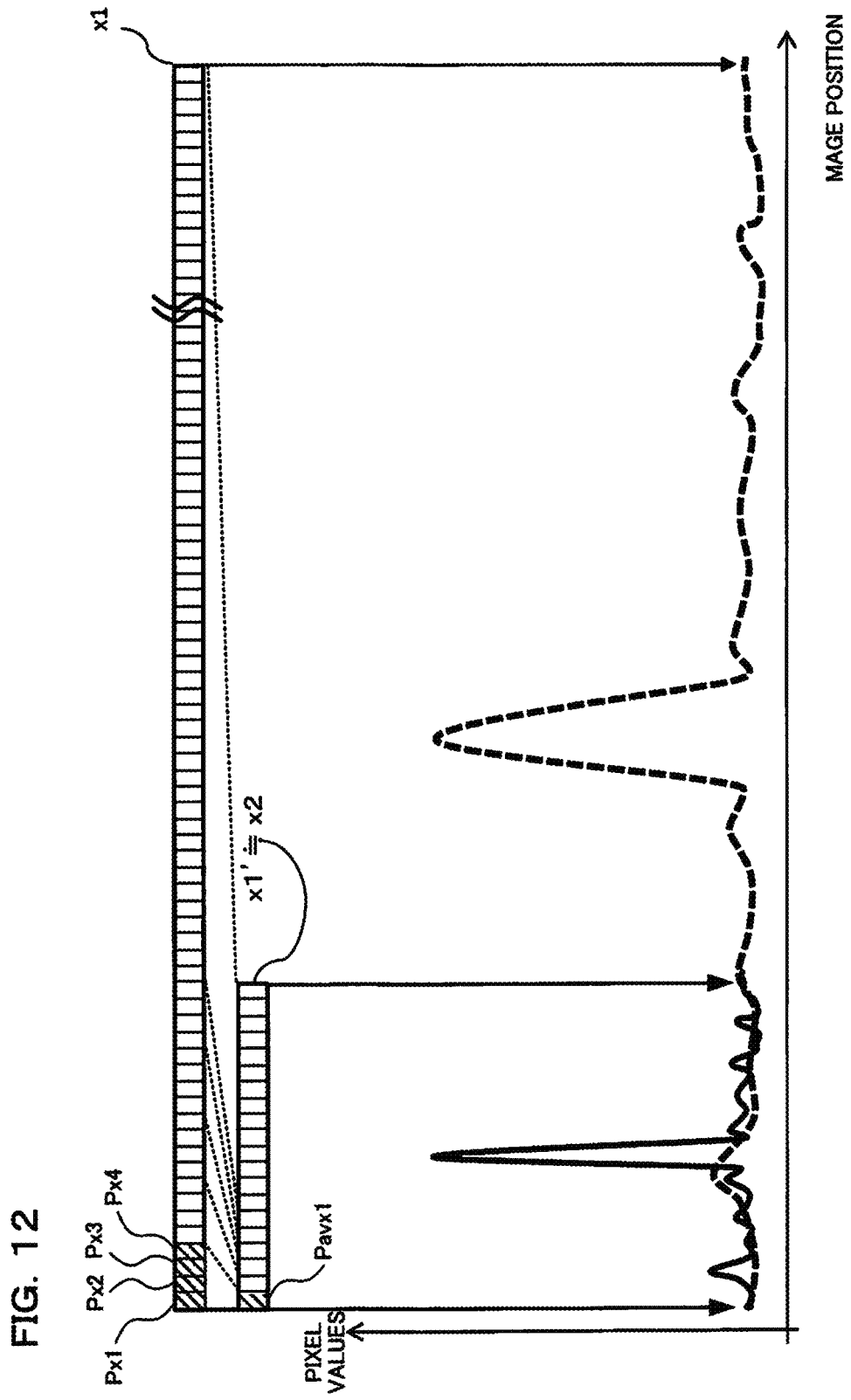
FIG. 12 is a graph showing an image signal for a wide focus detection region (x1), in the camera of one embodiment of the present invention.

However, with the method described in patent publication 1, processing takes a lot of time, as was described previously. Therefore, to ensure speed increase of computational processing time and allow rapid movement to a close to in focus state, a focus detection method has been considered whereby pixel values of four adjacent AF pixels are added, and image shift amount is calculated using an image signal resulting from having averaged pixel values of the four AF pixels, as shown in FIG. 12. With FIG. 12, pixel values of AF pixels Px1 to Px4 are added, and are then replaced with a pixel value of pixel Pavx1 that has been averaged. As a result of this processing, the number of pixels is reduced to ¼, and as a result of this a number of pixels that are subjected to computational processing is reduced, and so computational processing is speeded up. However, errors are contained as a result of averaging pixel values over the four AF pixels, and focus detection precision becomes bad.

Therefore, image shift amount having bad detection precision is not directly detected from the wide focus detection region x1, and image shift amount is detected from a normal focus detection region x2 that is narrower than the wide focus detection region x1, as described below. By detecting image shift amount from the normal focus detection region x2, it is possible to improve precision.

Figure 13:
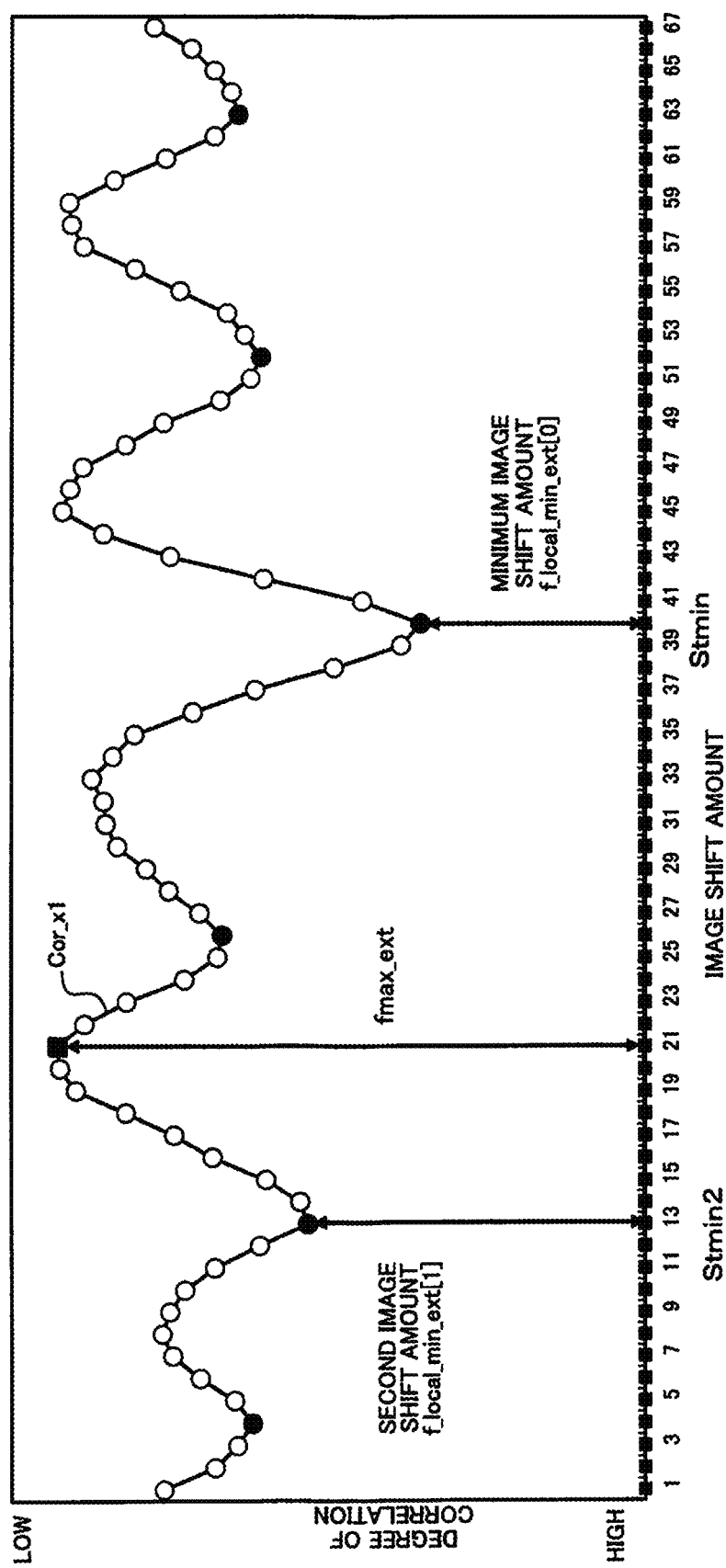
FIG. 13 is a drawing showing second image shift amount for a wide focus detection region (x1), in the camera of one embodiment of the present invention.

With this embodiment, a degree of correlation for image shift amount such as shown in FIG. 13 is calculated from the wide focus detection region x1 using pixel values that have been subjected to moving average (in FIG. 13, correlation line Cor_x1), a provisional in-focus position is determined using minimum shift amount Stmin having a minimum degree of correlation that was obtained from this degree of correlation, and the image shift amount having the next smallest degree of correlation (second image shift amount Stmin2), and a true in-focus position is calculated from this provisional in-focus position. Specifically, if a relationship between the degree of correlation of minimum image shift amount Stmin of wide focus detection region x1 and degree of correlation for second image shift amount Stmin2 (second minimum value) satisfy the following conditional expression (2), the minimum image shift amount Stmin is made a value close to a true in-focus position, and this is made a provisional in-focus position (Ext_el_dat_near_cyc).

second minimum value determination conditional expression:

$$\text{if}(f\_local\_min\_ext[1]) > \{f\_local\_min\_ext[0] + (fmax\_ext - f\_local\_min\_ext[0]) * \text{FLUCTUATION\_RATE})\} \quad (2)$$

f_local_min_ext [ ] is a degree of correlation corresponding to image shift amount of the wide focus detection region x1. fmax_ext is maximum value of degree of correlation. FLUCTUATION_RATE is a constant. Also, * means multiply. With the example shown in FIG. 13, f_local_min_ext[ ] is expressing degree of correlation in ascending order of array index 0, 1, 2, . . . .

Figure 14:
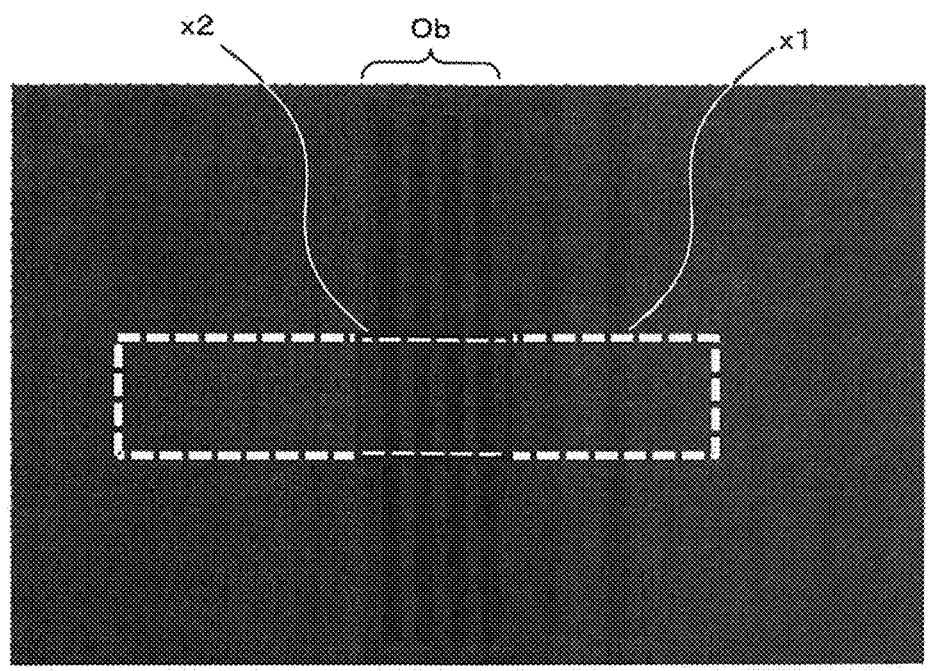
FIG. 14 is a drawing showing a relationship between a normal focus detection region and a wide focus detection region, with the camera of one embodiment if the present invention.

FIG. 14 is one example showing a relationship of sizes of regions that have been set in the normal focus detection region x2 and the wide focus detection region x1. It should be noted that in FIG. 14 the plurality of vertical black lines Ob represent a periodic subject.

Figure 15:
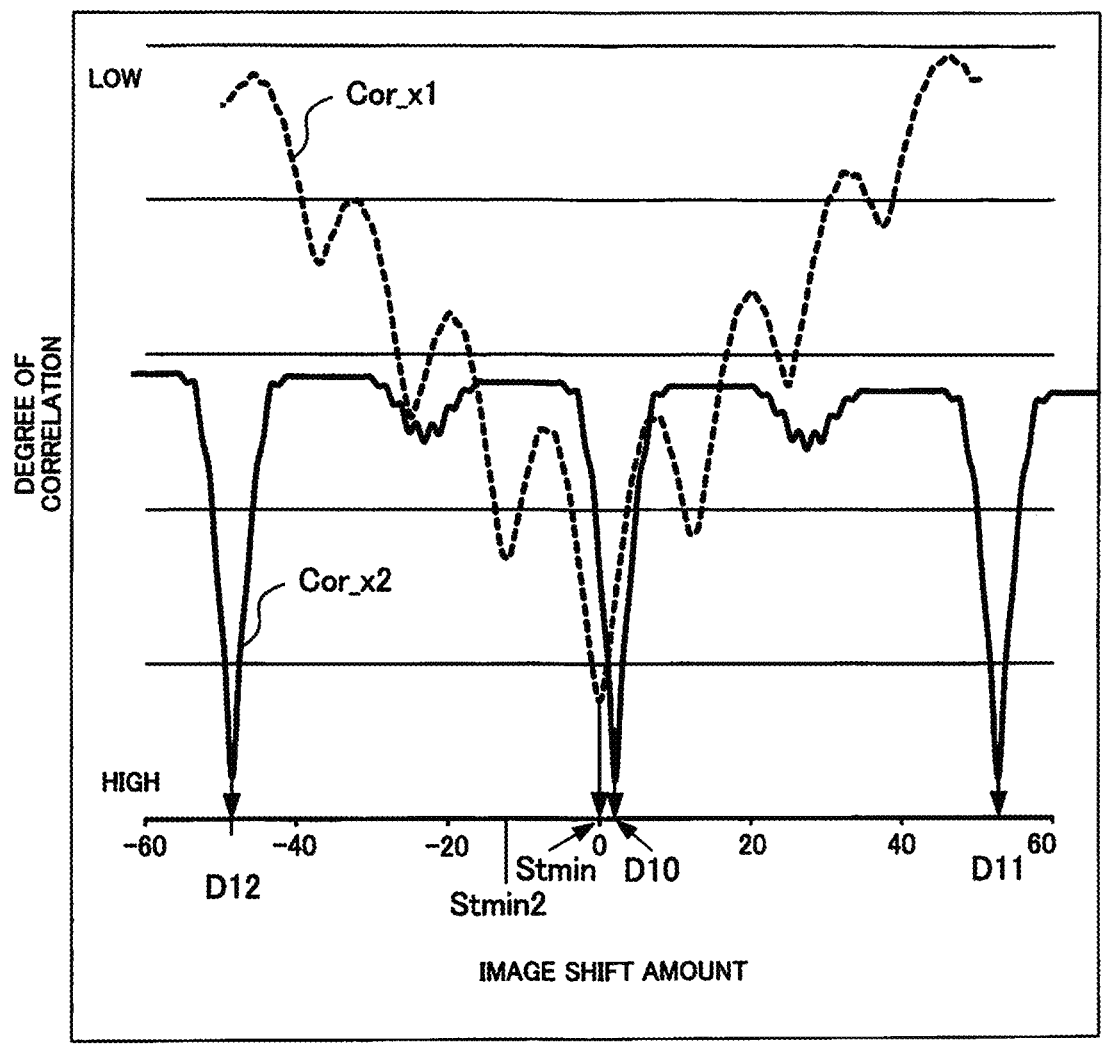
FIG. 15 is a graph showing correlation calculation results, in the camera of one embodiment of the present invention.

FIG. 15 is a graph showing one example of a relationship between image shift amount and degree of correlation in a case of a subject such as shown in FIG. 14 and where a focus detection region x1 and a focus detection region x2 have been set. In FIG. 15 the horizontal axis represents image shift amount and the vertical axis represents degree of correlation. Degree of correlation Cor_x1 shown by the dashed line is a degree of correlation that has been calculated using pixel values that have been subjected to moving average for wide focus detection region x1, and corresponds to degree of correlation Cor_x1 shown in FIG. 13 (in FIG. 13 and FIG. 15, since there are different detection subjects the shape of degree of correlation is different). Also, degree of correlation Cor_x2 shown by the solid line is a degree of correlation that has been calculated using pixel values that have been acquired in normal focus detection region x12.

In the example shown in FIG. 15 also, degree of correlation Cor_x1 based on pixel values that were acquired with wide focus detection region x1 satisfy a determination conditional expression for a second minimum value represented by expression (2), similarly to the example shown in FIG. 13. Specifically, the degree of correlation of minimum image shift amount Stmin (f_local_min_ext[0]) and degree of correlation of the second image shift amount Stmin2 (f_local_min_ext[1]) satisfy the expression (2). Since this expression is satisfied, f_local_min_ext[0] (minimum image shift amount Stmin) is made a provisional in-focus position Ext_el_dat_near_cyc.

Also, in the example shown in FIG. 13, degree of correlation Cor_2 based on pixel values that were acquired in the normal focus detection region constitute a minimum value in D10, D11 and D12, as shown in the drawing, and image shift amount at this time is respectively made el_dat[0], el_dat[1], el_dat[2]. An absolute value of a difference between provisional in-focus position (Ext_el_dat_near_cyc) and each image shift amount corresponding to a minimum value of a normal focus detection region (el_dat[[ ] corresponding to f_local_min[ ]) that is the smallest is selected, and focus is performed with that image shift amount (defocus amount).

A final in-focus position is made an image shift amount that satisfies expression (3) below.

Equation for final in-focus position:

$$\text{Final in-focus position:} \min(\text{abs}(Ext\_el\_dat\_near\_cyc - el\_dat[\ ]))(el\_dat[\ ] \text{ is three image shift amounts}, 0 \text{ to } 2) \quad (3)$$

With the example shown in FIG. 15, the smallest of absolute values of respective differences between Stmin (Ext_el_dat_near_cyc) and D10(el_dat[0]), D11(el_dat[1]) and D12(el_dat[2]) is selected. With the example shown in FIG. 15 a final image shift amount becomes el_dat[0] (D10).

In this way, in a case where pressing down of the release button halfway (1st release) is performed, if degree of correlation Cor_x1 based on pixel values that were acquired in wide focus detection region x1 satisfies expression (2), a minimum image shift amount Stmin is made a value close to a true in-focus position, and this is made a provisional in-focus position (Ext_el_dat_near_cyc). Then, a difference between the provisional in-focus position and a plurality of minimum values (el_dat[ ]) that appear at degree of correlation Cor_x2 based on pixel values that were required in normal focus detection region x2 is calculated, and the smallest minimum value is selected by an absolute value of the difference. In-focus position is determined based on image shift amount corresponding to this smallest minimum value, and the focus lens is moved towards this in-focus position.

(b) Close to in-Focus State

If processing for the significantly defocused state of (a) described above is performed and close to an in-focus position is reached, the close to in focus state of (b) is achieved. If this close to in-focus state is reached, then in order to shorten computation time focus detection processing is performed by limiting to the normal focus detection region x2 and using pixel values of this region x2, without performing computational processing that uses pixel values of the wide focus detection region x1 (refer to FIG. 9).

Figure 16:
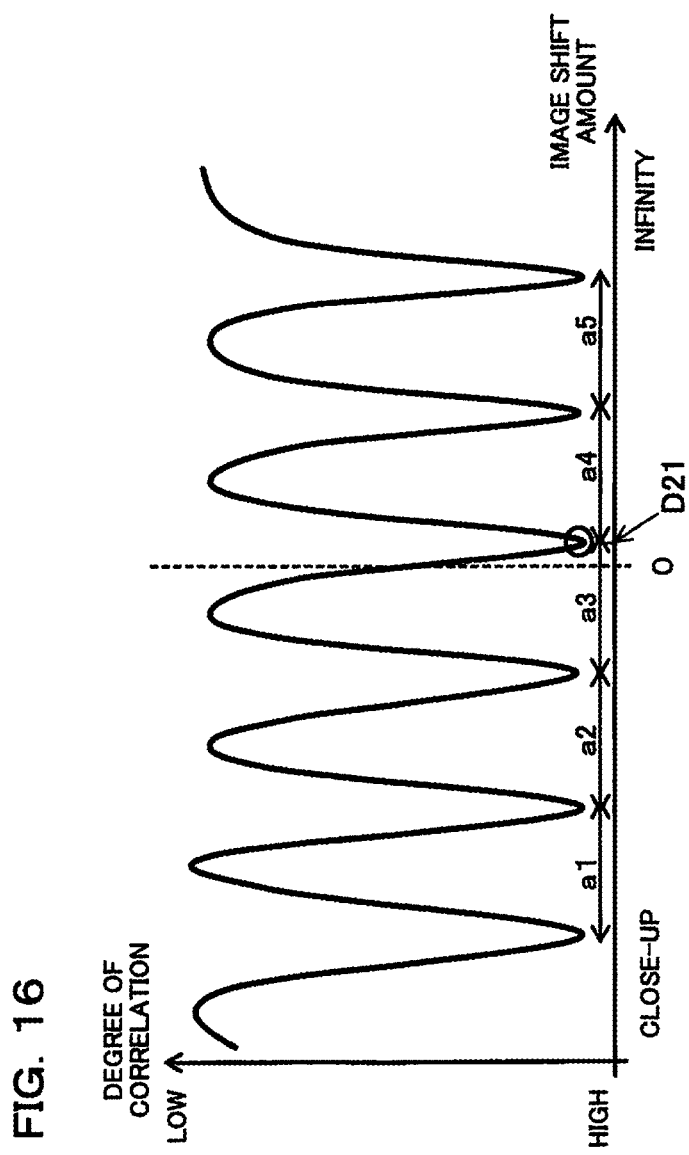
FIG. 16 is a graph showing image shift amount calculation for a normal focus detection region (x2), in the camera of one embodiment of the present invention.

However, a plurality of shift amounts will be detected in the normal focus detection region x2 also, in the case of a subject that has a periodic pattern. With the example where the subject is a bus that was shown in FIG. 9, since there is also a periodic pattern in the window jambs in the normal focus detection region x2, a plurality of minimum values will arise in the image shift amount graph, as shown in FIG. 16. It is therefore not possible to easily judge which image shift amount is a true in-focus position.

Figure 17:
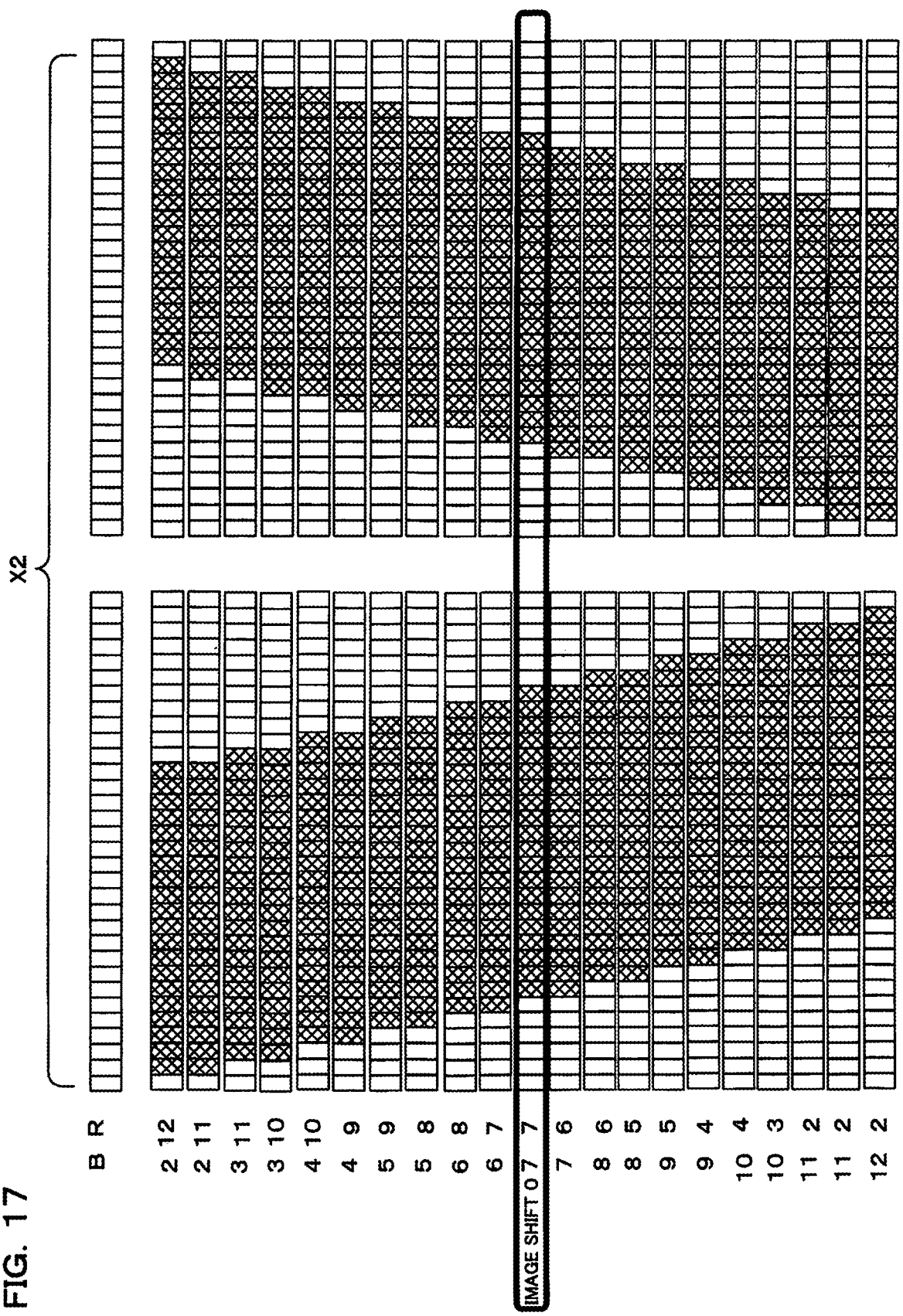
FIG. 17 is a drawing showing image shift amount calculation for a normal focus detection region (x2), in the camera of one embodiment of the present invention.

Accordingly, as a method for judging a true image shift amount, it is assumed that a position where image shift amount is extremely close to 0 is a true image shift amount since close to in focus is already approached immediately after 1st release pressing down. With the example shown in FIG. 16, position D21 where image shift amount is extremely close to 0 (shown in the circle mark in FIG. 16) is determined to be a true shift amount Also, for normal focus detection region x2, degree of correlation is detected by shifting computation position for each single pixel in all regions of focus detection region x2, in correlation calculation to calculate image shift amount such as shown in FIG. 17. As a result, focus detection precision is good. It should also be noted that degree of correlation is calculated from the following equation.

degree of correlation=Σ|B pixels(i)–R pixels(i)|

Figure 18A:
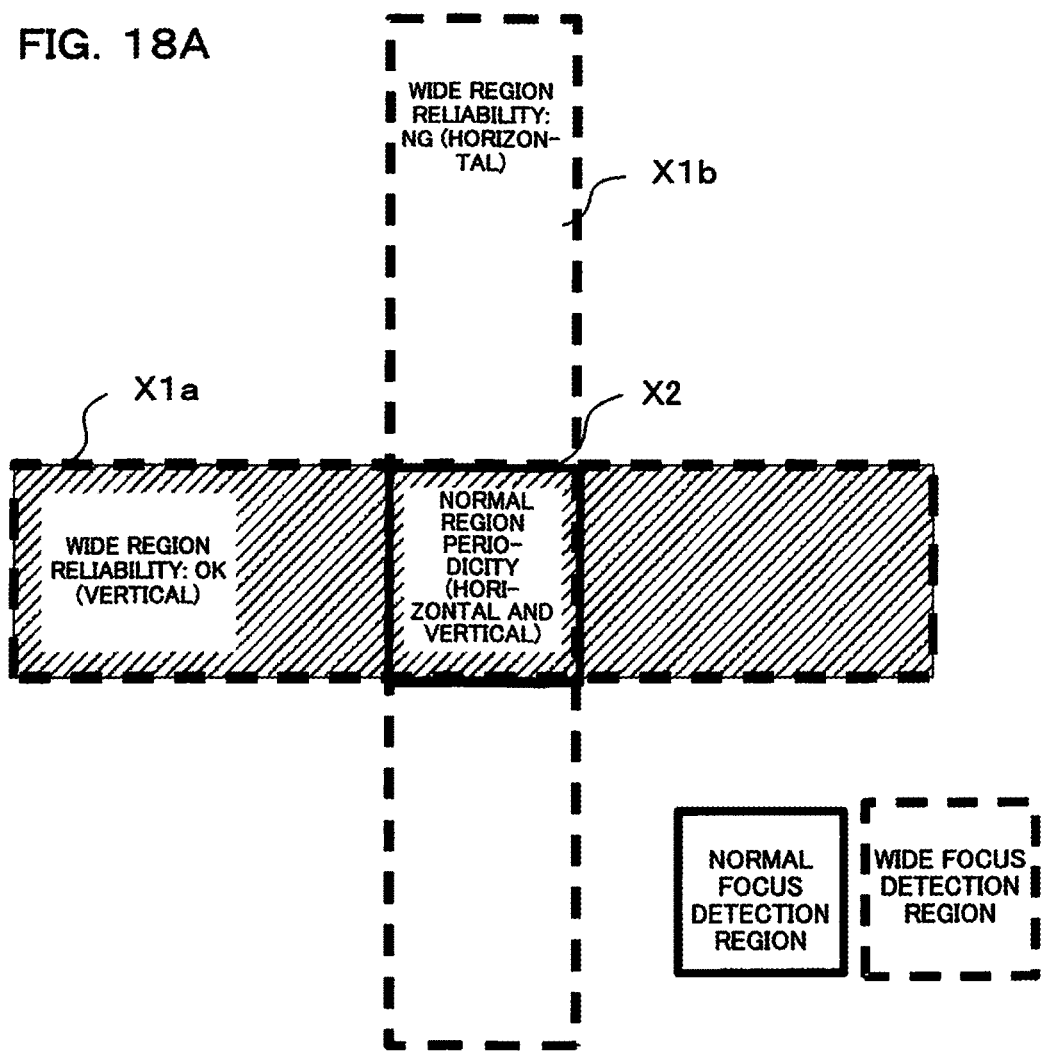
FIG. 18A to FIG. 18E are drawings showing selection of image shift amount in the case of cross ranging, with the camera of one embodiment of the present invention.

Also, with this embodiment, cross ranging is performed. As was described previously, focus detection is performed using a phase difference detection method. Ranging pixels for phase difference detection of the wide focus detection region x1 are arranged in both of a horizontal arrangement x1a of ranging pixels where some pixels are light shielded in the lateral direction, and a vertical arrangement x1b of ranging pixels where some pixels are light shielded in the vertical direction, and image shift amount is calculated for the respective arrangements, as shown in FIG. 18A. The horizontal arrangement x1a is an arrangement that is suitable for a case of a subject having edges extending in a vertical direction (for example, vertical lines), while the vertical arrangement x1b is suitable for a case of a subject having edges extending in a horizontal direction (for example, horizontal lines).

With cross ranging also, detection is also performed in the normal focus detection region x2. As shown in FIG. 18A, a region where the wide focus detection regions x1a and x1b intersect is set to detect, and image shift amount is calculated using pixel values of both ranging pixels that have been arranged vertically and ranging pixels that have been arranged horizontally within this region. It should be noted that reliability OK described in FIG. 18A represents that a single image shift amount exists, while reliability NG represents a case where a second image shift amount exists, or reliability NG in correlation calculation that was conventionally performed (for example, contrast NG etc.).

Figure 18B:
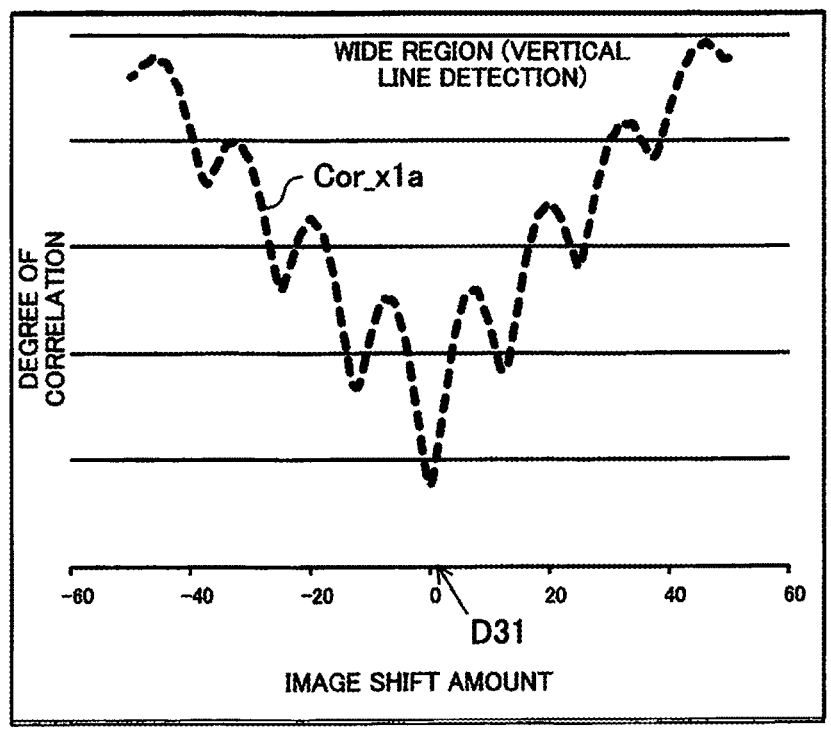
Figure 18C:
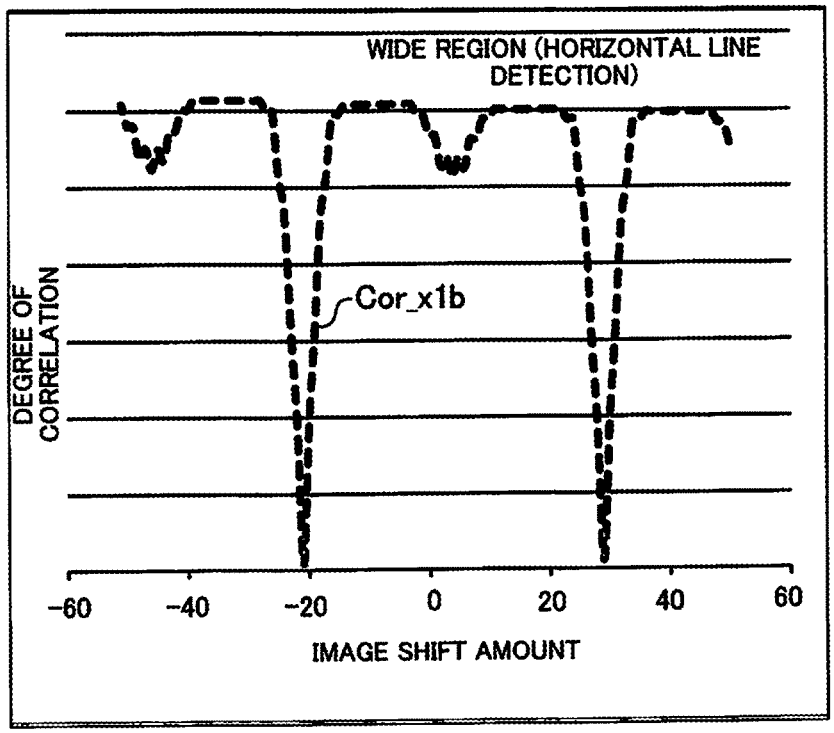

FIG. 18B is an example where degree of correlation Cor_x1a has been calculated for every image shift amount in the horizontally arranged wide focus detection region x1a, and FIG. 18C is an example where degree of correlation Cor_x1b has been calculated for every image shift amount in the vertically arranged wide focus detection region x1b. Degree of correlation for the horizontal arrangement (for vertical line detection) shown in FIG. 18B satisfies the previously described expression (2), but the degree of correlation for the vertical arrangement (for horizontal line detection) shown in FIG. 18C does not satisfy the previously described expression (2). Image shift amount D31 corresponding to minimum value of degree of correlation Cor_x1a shown in FIG. 18B is therefore made a provisional in-focus position.

As was described previously, in a close to in-focus region in-focus position is obtained by limiting to normal focus detection region x2 and calculating degree of correlation for every image shift amount using pixel values from ranging pixels of that region. In the case of cross ranging, in a significantly defocused state, if either the horizontally arranged wide focus detection region x1a or the vertically arranged wide focus detection region x1b is selected, degree of correlation is calculated for each image shift amount based on pixel values of either the horizontally arranged or vertically arranged ranging pixels that have been selected within normal focus detection region x2.

Figure 18D:
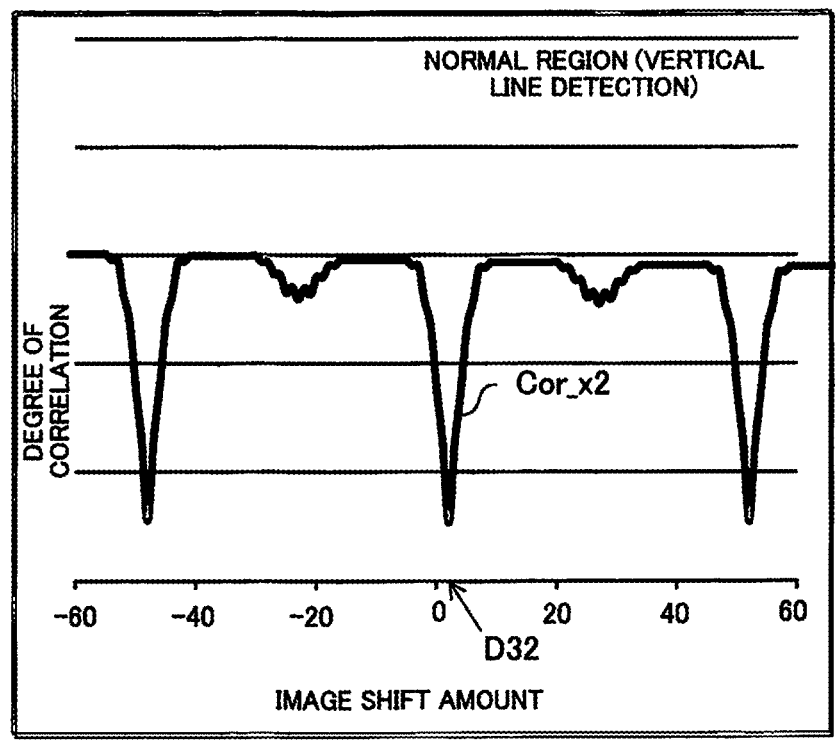
Figure 18E:
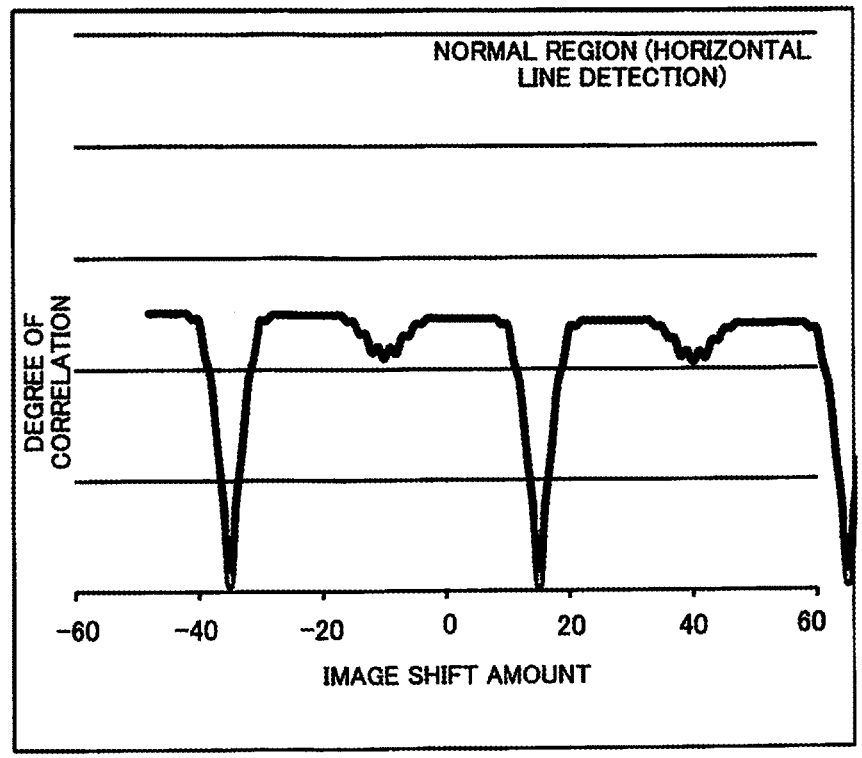

FIG. 18D shows degree of correlation that has been calculated for each image shift amount using pixel values of horizontally arranged (for vertical line detection) ranging pixels within normal focus detection region x2, and FIG. 18E shows degree of correlation that has been calculated for each image shift amount using pixel values of vertically arranged (for horizontal line detection) ranging pixels within normal focus detection region x2. With the examples shown in FIG. 18B and FIG. 18C, since, within the cross arranged wide focus detection region x1, the horizontally arranged (for vertical line detection) focus detection region x1a was adopted, in a close to in-focus region, a final in-focus position is calculated based on a degree of correlation that is based on a horizontal arrangement within the normal focus detection region x2, namely a minimum value of degree of correlation Cor_x2 shown in FIG. 18D. In calculation of the final in-focus position, it is determined that a position D32 where image shift amount is closest to 0 is true image shift amount.

In the case of performing cross ranging, the previously described ranging area setting section 35 functions as a focus detection region setting section for setting a third focus detection region (refer to detection region a1b) having a phase difference detection direction that is different to a phase difference detection direction of the first focus detection region (refer to region x1a), and a plurality of fourth focus detection regions (within region x2) that are included within the third focus detection region, are narrower than the third focus detection region, and have the same phase difference detection direction.

Also, in the case of performing cross ranging, the previously described periodicity-containing subject countermeasure section 38 functions as a determination section for determining whether or not there is a periodicity-containing subject for the first focus detection region and the third focus detection region.

Also, the previously described AF calculation section 23 functions as a control section that performs respective phase difference detection based on image data of the first focus detection region and image data of the second focus detection region, and if it is determined that that there is not a periodicity-containing subject for the first focus detection region, and it is determined that there is a periodicity-containing subject for the second focus detection region, performs a focus adjustment operation by selecting a phase difference that is closest to a phase difference that has been detected for the first focus detection region, among a plurality of phase differences that have been detected in the second focus detection region.

(c) Subject Tracking State

As was described previously, if close to in focus is reached, degree of correlation for each image shift amount is calculated using pixel values of ranging pixels in the normal focus detection region x2, from pixel values of ranging pixels in wide focus detection region x1, an in-focus position is obtained, and the focus lens is driven to this position. In a case where contrast AF (C-AF) mode is set, if a subject is moving focus is always maintained by tracking movement of the subject (for example, a bus that moves in the example shown in FIG. 9), and it is desirable to maintain a state where the user can perform shooting.

In this case, since the focus lens is already close to an in-focus position, with this embodiment focus detection is performed using pixel values of ranging pixels of the narrow focus detection region x3 in FIG. 9. In this case, when detecting degree of correlation for every image shift amount, since the focus lens is close to an in-focus position the image shift amount should be within a specified range from a position where image shift amount is 0. With this embodiment, there is limitation to a range of ±a0/2 from a position where image shift amount is 0, as shown in FIG. 19. The reason for setting this range will be described later.

Figure 20:
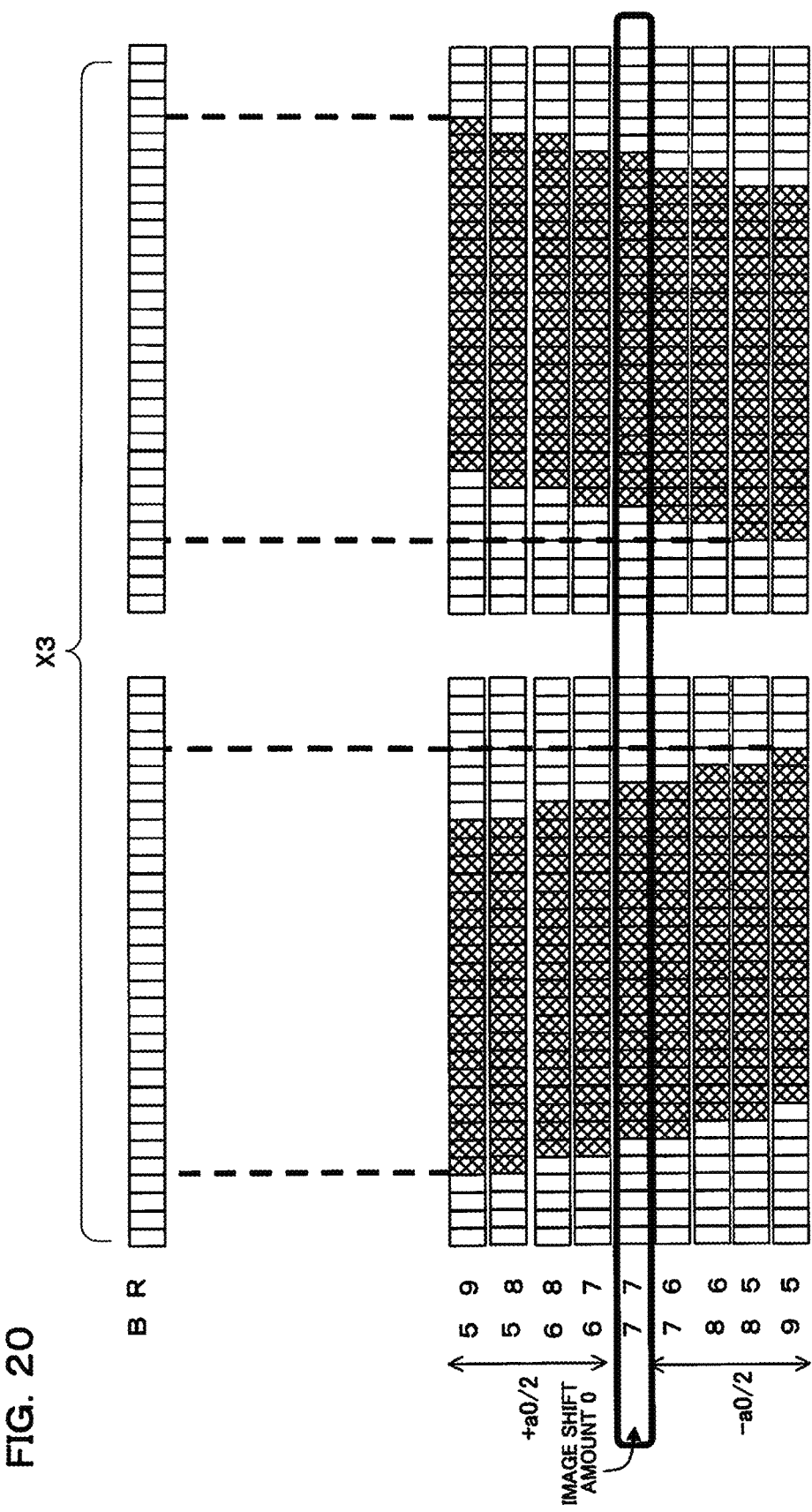
FIG. 20 is a drawing showing image shift amount calculation for a narrow focus detection region (x3), in the camera of one embodiment of the present invention.

A range of correlation calculation for calculating image shift amount is shown in FIG. 20. In a subject tracking state, compared to FIG. 17 of the close to in-focus state, computation position that is shifted is restricted to a narrow range corresponding to image shift amount±a0/2 before and after the in-focus position. This is because the subject tracking state is to enable sufficient detection even with narrow correlation calculation range for focus detection due to a focused state being achieved once. Since the computation range is narrow, it is possible to perform rapid processing, and it becomes possible to continuously achieve sufficient focus on a moving subject.

As was described previously, the narrow focus detection region x3 is provided within the normal focus detection region x2. In this setting it is preferable to align a range of the narrow focus detection region x3 with a periodic pattern of a subject. As a method of aligning to a periodic pattern, with this embodiment an average value a0 for intervals a1, a2, a3, a4 and a5 is obtained using intervals a1 to a5 (refer to FIG. 19) of a plurality of image shift amounts that have been detected in normal focus detection region x2, as shown by the equation below, and a range of this a0±a0/2 is set.

$a0=(a1+a2+a3+a4+a5)/5$

By setting a detection range for narrow focus detection region x3 in accordance with the range of ±a0/2 with a position where image shift amount is zero as a center, detection where a calculation result that is always closest to an image shift amount of 0 becomes possible at only one location. Further, since there is computation in a narrow focus detection region there is also the effect of shortening computational processing time. It should be noted that with this embodiment, calculation has been performed using five intervals close to image shift amount 0, but this is not limiting, and calculation may be performed using four intervals or less, or six or more intervals.

There may be cases where a subject is lost and focus is not approached while C-AF mode is set and 1st release is being maintained. In this case calculation of a true image shift amount will no longer be achieved in the narrow focus detection region x3. However, since it is always possible to detect a closest image shift amount in the wide focus detection region x1, the focus detection region may be switched to the wide focus detection region x1, degree of correlation calculated for every image shift amount using pixel values of ranging pixels of this region x1, and in-focus position obtained.

Determination, that a subject is lost and focus is no longer approached arises in cases such as where it is not possible to detect image shift amount of high reliability in the narrow focus detection region x3, or where it is not possible to detect image shift amount because reliability was low in the first place.

Next, a focus adjustment operation of this embodiment will be described using the flowcharts shown in FIG. 21A and FIG. 21B. This flow is executed by the CPU etc. that is provided within the AF calculation section 23 controlling each section shown in FIG. 1 and FIG. 2 based on programs that have been stored in the nonvolatile memory 23a.

If the release button is pressed down half way (1st release), the flow shown in FIG. 21A commences operation. First, focus detection is performed in a normal focus detection region (S1). Here, the ranging area setting section 35 performs setting of the normal focus detection region x2. A plurality of normal focus detection regions are set on the image sensor 21, and the normal focus detection region x2 is set based on ranging points that have been set manually by the user, or positions of a face etc. that has been detected by the face detection section 22a within the image processing section 22. Once this focus detection region x2 has been set, degree of correlation for each image shift amount is calculated based on pixel values of ranging pixels within the focus detection region x2 of the image sensor 21.

If focus detection has been performed in the normal focus detection region, it is next determined whether or not there is periodicity in a subject (S3). Here, the periodicity-containing subject countermeasure section 38 determines whether or not there is periodicity in the degrees of correlation for each of the image shift amounts that were calculated in step S1. Determination of whether or not there is periodicity is performed based on the three points (A1) to (A3) that were described previously using FIG. 8A to FIG. 8B.

If the result of determination in step S3 is that there is not periodicity in the subject, a normal image shift amount is selected (S13). Here, image shift amount is calculated based on the minimum value of degree of correlation for each of the image shift amounts for normal focus detection region x1 that were calculated in step S1.

On the other hand, if the result of determination in step S3 is that there is periodicity in the subject, next focus detection is performed in the wide focus detection region (S5). Here, the ranging area setting section 35 performs setting of the wide focus detection region x1. The wide focus detection region x1 is set such that the normal focus detection region x2 becomes a center, as shown in FIG. 3. Once this focus detection region x1 has been set, degree of correlation for each image shift amount is calculated based on pixel values of ranging pixels within the focus detection region x1 of the image sensor 21. It should be noted that in the case where focus detection is performed with cross ranging, in this step degree of correlation is calculated based on pixel values of ranging pixels from both a vertical arrangement and a horizontal arrangement.

If focus detection has been performed in the wide focus detection region, it is next determined whether or not there is periodicity in a subject (S7). Here, the periodicity-containing subject countermeasure section 38 determines whether or not there is periodicity in the degrees of correlation for each of the image shift amounts that were calculated in step S3. Determination of whether or not there is periodicity is performed based on the three points (A1) to (A3) that were described previously using FIG. 8A to FIG. 8B. It should be noted that in the case where focus detection is performed with cross ranging, in this step determination of periodicity in degree of correlation is based on both a vertical arrangement and a horizontal arrangement.

If the result of determination in step S7 is that there is no periodicity a provisional in-focus position is determined (S9). Here, as was described using FIG. 13 to FIG. 15, the periodicity-containing subject countermeasure section 38 calculates degree of correlation or each image shift amount from the wide focus detection region x1, and if a relationship between the minimum image shift amount Stmin and the second image shift amount Stmin2 satisfies expression (2) makes the minimum image shift amount Stmin a provisional in-focus position. It should be noted that in a case of performing focus detection with cross ranging, the provisional in-focus position is determined based on arrangement in a direction having high reliability, as was described using FIG. 18A to FIG. 18E.

If the provisional in-focus position has been determined, next a final image shift amount is determined (S15). Here, the periodicity-containing subject countermeasure section 38 detects an image shift amount that is closest (minimum value) to the provisional in-focus position that was determined in step S9, from among minimum values based on degree of correlation for each image shift amount in normal focus detection region x2, as was described using FIG. 15, and that image shift amount is determined as the final image shift amount.

If the result of determination in step S7 is that there is periodicity, whether or not to widen the region is determined (S11). In a case where a range that is set for the wide focus detection region x1 is not the entire range of the image sensor 21 in the lateral direction (or vertical direction), it is possible to further widen the wide focus detection region x1. As a result of further widening the wide focus detection region there may be cases where there is no longer periodicity in the subject. In this step, therefore, it is determined whether or not it is possible to further widen the range of the wide focus detection region x1 act is currently set.

If the result of determination in step S11 is that it is possible to widen the region, the focus detection region is widened (S19). Here, the ranging area setting section 35 makes the range of the wide focus detection region x1 wider. If widening has been performed, processing returns to step S5 and the previously described processing is executed.

On the other hand, if the result of determination in step S11 is that it is not possible to widen the region, selection is performed from normal image shift amounts in accordance with conditions (S17). In this case, the smallest image shift amount from among a plurality of minimum values for the normal focus detection region x2 that was acquired in step S1 is made a final image shift amount.

If image shift amount has been determined in steps S13, S15 and S17, it is next determined whether or not there is focus (S21). Here, it is determined whether or not the image shift amount that has been determined is 0 or close to 0 (within a specified range).

If the result of determination in step S21 is not focus, lens drive is performed with the final defocus amount (S23). Here, the AF calculation section 23 calculates drive amount for the focus lens based on image shift amount that was determined in steps S13, S15 or S17, and the focus lens is moved to an in-focus position by the actuator 12 by means of the lens control section 13. If lens drive has been performed processing returns to step S1, and the previously described processing is executed.

On the other hand, if the result of determination in step S21 is in focus, it is determined whether or not C-AF (continuous AF mode) is active (S25). C-AF is manually set by the user on an AF-mode setting screen or the like, and so determination is based on this setting state.

If the result of determination in step S25 is that C-AF mode has not been set, the flow for this focus adjustment operation is terminated. Since C-AF mode it is not set (single AF mode is set), if the focus lens is put into a focused state once, the focus adjustment operation is terminated.

On the other hand, if the result of determination in step S25 is that C-AF mode is set, next focus detection is performed in the narrow focus detection region (S27). Here, the ranging area setting section 35 restricts to a detection range (correlation calculation range) corresponding to ±a0/2 from a position where a image shift amount is 0, as was described using FIG. 19, and performs correlation calculation for the narrow focus detection region x3 (refer to FIG. 9). Degree of correlation for each image shift amount is calculated based on pixel values of ranging pixels within the focus detection region x3 of the image sensor 21 corresponding to this focus detection region x3. This correlation calculation is performed by limiting the correlation calculation range, as was described using FIG. 20.

If focus detection has been performed in the narrow focus detection region of step S27, it is next determined whether or not there is focus (S29). Here, similarly to step S21, it is determined whether or not the image shift amount that has been determined is 0 or close to (within a specified range). If the result of this determination is not in a focused range, processing returns to step S1 and the previous processing is executed.

On the other hand, if there is focus, it is determined whether or not there is 2nd release (S31). In the event that composition etc. has been determined and shooting is performed, the user performs full pressing of the release button (2nd release). Here, determination is based on the operating state of the release button. If the result of this determination is not 2nd release, then since C-AF mode is being maintained processing returns to step S27 and focus detection is repeated for the narrow focus detection region. On the other hand, if 2nd release has been performed, the flow for this focus adjustment operation is terminated and there is a transfer to processing for an actual shooting operation.

With the above described one embodiment of the present invention, there are the following features (1) to (5).

(1) Immediately after 1st release pressing down, since there is focus without losing the closest subject, image shift amount for a subject in a significantly defocused state in a wide focus detection region is calculated (refer to region (a) in FIG. 10, and steps S1 to S9 and S15 in FIG. 21A). Specifically, the fact that an image shift amount that was detected from the wide focus detection region does not have periodicity (=the fact that a plurality of image shift amounts do not exist) is confirmed (refer to S5 and S7 in FIG. 21A), and that image shift amount is made a provisional in-focus position (refer to S9 in FIG. 21A). An image shift amount that is closest to the provisional in-focus position is selected from among a plurality of image shift amounts that have been detected from a normal focus detection region (refer to step S15). That image shift amount is made a true in-focus position, a defocus amount is calculated and the focus lens is driven (refer to S23 in FIG. 21B). It should be noted that the normal focus detection region x2 is contained inside the wide focus detection region x1 (refer to FIG. 9). According to this embodiment, since focus detection is performed by cleverly combining a wide focus detection region and a normal focus detection region that is narrower than the wide focus detection region, a true image shift amount is determined at high speed even if there is a subject having a periodic pattern, and it is possible to perform focusing reliably.

(2) When correlation calculation using the vertical direction and horizontal direction phase difference (=cross ranging) is possible (refer to FIG. 18A), in a case where a periodic pattern appears in both vertical and horizontal directions of the normal focus detection region, a true in-focus position is determined in accordance with the method (1) described above with priority given to image shift amounts of a normal focus detection region for the same direction as the detection direction (vertical or horizontal) in which a provisional image shift amount was acquired for the wide focus detection region (refer to FIG. 18B to FIG. 18E). According to this embodiment, even if cross ranging is performed it is possible to rapidly detect a true in-focus position from vertical direction and horizontal direction focus detection regions. It should be noted that cross ranging arrangement directions are not limited to the vertical and horizontal directions, and may be different directions such as diagonal directions.

(3) While 1st release is being maintained (region (c) in FIG. 10), since focusing continues on the subject that was focused on immediately after 1st release pressing, image shift amount for a subject in a close to in-focus state in a narrow focus detection region is calculated (refer to S27 in FIG. 21B). Image shift amount is detected limiting narrow focus detection region to only close to in focus (refer to FIG. 19). According to this embodiment, it is possible to continue maintaining a focused state on a subject that was in a focused state, such as when C-AF mode has been set. In particular, while 1st release is being maintained, it becomes possible to continuously focus stably at high speed without losing the main subject that is close to in focus, even for a subject that has a periodic pattern.

(4) In a case where a periodicity-containing subject has been detected in (1) above, image shift amount is calculated by setting a correlation calculation range for a narrow focus detection region so as to correspond to an image shift amount of ±a0/2, with an in-focus position as a center, from range a0 that was obtained by averaging intervals between a plurality of image shift amounts that were detected in a normal focus detection region (refer to FIG. 19, and S27 in FIG. 21B). According to this embodiment, it is possible to set a narrow correlation calculation range, as a result of this it is possible to speed up computational processing, and it is possible to continuously maintain a focused state.

(5) While 1st release is maintained (region (c) in FIG. 10), it is determined whether or not a subject has moved away from a focused state and a defocus state has arisen (refer to S29 in FIG. 21B), and if a defocus state is determined results of a wide focus detection region are selected (refer to S29 No in FIG. 21B→S1 in FIG. 21A). According to this embodiment, when there is no longer a focused state due to the subject moving out of a focus detection region or a subject distance changing significantly etc., it is possible to rapidly detect in-focus position.

As has been described above, with the one embodiment of the present invention, a first focus detection region (for example, region x1 in FIG. 9) and a plurality of second focus detection regions (for example, region x2 in FIG. 9), that are contained in the first focus detection region and that are narrower than the first focus detection region, are set in an imaging region (for example, S1 and S5 in FIG. 21A). Also, phase difference detection is performed based on image data of the first focus detection region or the second focus detection regions (for example, S1 and S5 in FIG. 21A), and based on the results of this focus detection it is determined whether or not a subject is a periodicity-containing subject that has a periodic image pattern (refer, for example, to S3 and S7 in FIG. 21A).

Respective phase difference detection is then performed based for image data of the first focus detection region and image data of the second focus detection regions, and if it is determined that that there is not a periodicity-containing subject for the first focus detection region (for example, S7 No in FIG. 21A), and it is determined that there is a periodicity-containing subject for the second focus detection regions (for example, S3 Yes in FIG. 21A), a focus adjustment operation is performed by selecting a phase difference that is closest to a phase difference that has been detected for the first focus detection region, among a plurality of phase differences that have been detected in the second focus detection regions (refer, for example, to S9 and S15 in FIG. 21A).

In this way, with the one embodiment of the present invention, in a case where a plurality of phase differences have been detected in the second focus detection regions, a phase difference that is closest to a phage difference that was detected in the first focus detection region is selected. This means that in determining a final phase difference, it is possible to rapidly perform processing with a low amount of computation. Specifically, even if there is a subject that has a periodic pattern, a true image shift amount is determined at high speed, and it is possible to reliably focus.

It should be noted that with the one embodiment of the present invention so called image plane phase difference AF, where phase difference AF detection pixels are arranged on an image sensor 21, is adopted for the purpose of phase difference AF detection. However, this is not limiting and a phase difference detection section may be provided separately to the image sensor 21.

Also, with the one embodiment of the present invention, the face detection section 22*a* and tracking section 22*b* within the image processing section 22 respectively have a face detection circuit and a tracking circuit, but instead of hardware circuits they may also be configured as software using a CPU and programs, may be implemented by hardware circuits such as gate circuits that are generated based on a programming language described using Verilog, or may be configured using a DSP (Digital Signal Processor). Suitable combinations of these approaches may also be used. The use of a CPU is also not limiting as long as elements fulfill a function as a controller.

Also, regarding each of the sections with the AF calculation section 23, besides being constructed in the form of software using a CPU and programs, some or all of these sections may be constructed with hardware circuits, or may have a hardware structure such as gate circuitry generated based on a programming language described using Verilog, or may use a hardware structure that uses software, such as a DSP (digital signal processor). Suitable combinations of these approaches may also be used. Calculation of defocus amount, calculation of reliability evaluation and contrast evaluation values, and generation of phase difference pixels etc. has been performed by repeating uniform computational processing, but these operations may also be configured using hardware circuits. The use of a CPU is also not limiting as long as elements fulfill a function as a controller.

Also, with the one embodiment of the present invention, an instrument for taking pictures has been described using a digital camera, but as a camera it is also possible to use a digital single lens reflex camera or a compact digital camera, or a camera for movie use such as a video camera, and further to have a camera that is incorporated into a mobile phone, a smartphone a mobile information terminal, personal computer (PC), tablet type computer, game console etc., or a camera for a scientific instrument such as a microscope, a camera for mounting on a vehicle, a surveillance camera etc. In any event, it is possible to adopt the present invention as long as a device carries out focus detection using phase difference AF.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A focus adjustment device that generates image data by receiving light of a subject image that has been subjected to pupil division by means of a photographing lens that includes a focus lens and performing photoelectric conversion, and performs a focus adjustment operation based on the image data, the focus adjustment device comprising:
    a processor having a focus region setting section, a focus detection section, a determination section and a control section, wherein
    the focus detection region setting section sets a first focus detection region, and a second focus detection region, that is contained in the first focus detection region and that is narrower than the first focus detection region, in an imaging region,
    the focus detection section performs phase difference detection based on image data of the first focus detection region or the second focus detection region;
    the determination section determines whether or not there is a periodicity-containing subject, where the subject has a periodic image pattern, based on the focus detection result; and
    the control section performs a focus adjustment operation based on phase difference detection results of the focus detection section,
    and wherein
    the control section performs respective phase difference detection based on image data of the first focus detection region and image data of the second focus detection region, and if it is determined that that there is not a periodicity-containing subject for the first focus detection region, and it is determined that there is a periodicity-containing subject for the second focus detection region, performs a focus adjustment operation by selecting a phase difference that is closest to a phase difference that has been detected for the first focus detection region, among a plurality of phase differences that have been detected for the second focus detection region.

2. The focus adjustment device of claim 1, wherein:
the control section, after having performed a focus adjustment operation by selecting a phase difference, among a plurality of phase differences that have been detected in the second focus detection region, that is closest to a phase difference that was detected in the first focus detection region, executes phase difference detection by limiting a detection range for phase difference detection using the focus detection section from in-focus to within a specified range based on image data of the second focus detection region.

3. The focus adjustment device of claim 2, wherein:
the control section executes phase difference detection based on image data of the first focus detection region if it has been determined that phase difference detection, based on image data of the second focus detection region, is no longer possible.

4. The focus adjustment device of claim 1, wherein:
the control section performs phase difference detection based on image data of the first focus detection region, and if a periodicity-containing subject has been determined, then phase difference detection is performed by setting a detection range for phase difference detection based on intervals between a plurality of phase differences that have been detected in the second focus detection region.

5. The focus adjustment device of claim 4, wherein:
the control section sets the detection range for phase difference detection based on an average value of a specified number of intervals among intervals between the plurality of phase differences.

6. The focus adjustment device of claim 1, wherein:
the focus detection region setting section sets a third focus detection region having a phase difference detection direction that is different than a phase difference detection direction of the first focus detection region, and a plurality of fourth focus detection regions, contained in the third focus detection region, that are narrower than the third focus detection region, and that have the same phase difference detection direction as the third focus detection region;
the determination section determines whether or not there is a periodicity-containing subject for the first focus detection region and the third focus detection region; and the control section, in a case where it has been determined that both the first focus detection region and the third focus detection region have a periodicity-containing subject, performs focus adjustment by selecting a phase difference that is closest to a phase difference detected in at least one focus detection region of the first focus detection region and the third focus detection region, among a phase difference detected in the second focus detection region or the fourth focus detection region corresponding to at least one of the first focus detection region and the third focus detection region.

7. A focus adjustment method that generates image data by receiving light of a subject image that has been subjected to pupil division by means of a photographing lens that includes a focus lens, and performing photoelectric conversion, and performs a focus adjustment operation based on the image data, the focus adjustment method comprising:

in an imaging region, setting a first focus detection region, and a second focus detection region, that is contained in the first focus detection region, and that is narrower than the first focus detection region;

performing phase difference detection based on image data of the first focus detection region or the second focus detection region;

determining whether or not there is a periodicity-containing subject, where the subject has a periodic image pattern, based on the focus detection result; and performing respective phase difference detection based on image data of the first focus detection region and image data of the second focus detection region, and if it is determined that that there is not a periodicity-containing subject for the first focus detection region, and it is determined that there is a periodicity-containing subject for the second focus detection region, performing a focus adjustment operation by selecting a phase difference that is closest to a phase difference that has been detected for the first focus detection region, among a plurality of phase differences that have been detected for the second focus detection region.

8. The focus adjustment method of claim 7, further comprising:

after having performed a focus adjustment operation by selecting a phase difference, among a plurality of phase differences that have been detected in the second focus detection region, that is closest to a phase difference that was detected in the first focus detection region, executing phase difference detection by limiting a detection range for phase difference detection using the focus detection section from in-focus to within a specified range based on image data of the second focus detection region.

9. The focus adjustment method of claim 8, further comprising:

executing phase difference detection based on image data of the first focus detection region if it has been determined that phase difference detection based on image data of the second focus detection region is no longer possible.

10. The focus adjustment method of claim 7, further comprising:

performing phase difference detection based on image data of the first focus detection region, and if a periodicity-containing subject has been determined, performing phase difference detection by setting a detection range for phase difference detection based on intervals between a plurality of phase differences that have been detected in the second focus detection region.

11. The focus adjustment method of claim 10, further comprising:

setting the detection range for phase difference detection based on an average value of a specified number of intervals among intervals between the plurality of phase differences.

12. The focus adjustment method of claim 7, further comprising:

setting a third focus detection region having a phase difference detection direction that is different than a phase difference detection direction of the first focus detection region, and a plurality of fourth focus detection regions, contained in the third focus detection region, that are narrower than the third focus detection region, and that have the same phase difference detection direction as the third focus detection region;

determining whether or not there is a periodicity-containing subject for the first focus detection region and the third focus detection region; and in a case where it has been determined that both the first focus detection region and the third focus detection region have a periodicity-containing subject, performing focus adjustment by selecting a phase difference that is closest to a phase difference detected in at least one focus detection region of the first focus detection region and the third focus detection region, among a phase difference detected in the second focus detection region or the fourth focus detection region corresponding to at least one of the first focus detection region and the third focus detection region.

13. A non-transitory computer readable medium that stores program code for causing execution of a focus adjustment on a computer of a focus adjustment device that generates image data by receiving light of a subject image that has been subjected to pupil division by means of a photographing lens that includes a focus lens and performs photoelectric conversion, and performs a focus adjustment operation based on the image data, the focus adjustment method comprising:

in an imaging region, setting a first focus detection region, and a second focus detection region, that is contained in the first focus detection region, and that is narrower than the first focus detection region;

performing phase difference detection based on image data of the first focus detection region or the second focus detection region;

determining whether or not there is a periodicity-containing subject, where the subject has a periodic image pattern, based on the focus detection result; and performing respective phase difference detection based on image data of the first focus detection region and image data of the second focus detection region, and if it is determined that that there is not a periodicity-containing subject for the first focus detection region, and it is determined that there is a periodicity-containing subject for the second focus detection region, performing a focus adjustment operation by selecting a phase difference that is closest to a phase difference that has been detected for the first focus detection region, among a plurality of phase differences that have been detected for the second focus detection region.

14. The non-transitory computer-readable medium of claim 13, wherein:

the focus adjustment method, after having performed a focus adjustment operation by selecting a phase difference, among a plurality of phase differences that have been detected in the second focus detection region, that is closest to a phase difference that was detected in the first focus detection region, executes phase difference detection by limiting a detection range for phase difference detection using the focus detection section from in-focus to within a specified range based on image data of the second focus detection region.

15. The non-transitory computer-readable medium of claim 14, wherein:
the focus adjustment method executes phase difference detection based on image data of the first focus detection region if it has been determined that phase difference detection based on image data of the second focus detection region is no longer possible.

16. The non-transitory computer-readable medium of claim 13, wherein:
the focus adjustment method performs phase difference detection based on image data of the first focus detection region, and if a periodicity-containing subject has been determined, performs phase difference detection by setting a detection range for phase difference detection based on intervals between a plurality of phase differences that have been detected in the second focus detection region.

17. The non-transitory computer-readable medium of claim 16, wherein:
the focus adjustment method sets the detection range for phase difference detection based on an average value of a specified number of intervals among intervals between the plurality of phase differences.

18. The non-transitory computer-readable medium of claim 13, wherein:
the focus adjustment method, sets a third focus detection region having a phase difference detection direction that is different than a phase difference detection direction of the first focus detection region, and a plurality of fourth focus detection regions, contained in the third focus detection region, that are narrower than the third focus detection region, and that have the same phase difference detection direction as the third focus detection region;
determines whether or not there is a periodicity-containing subject for the first focus detection region and the third focus detection region; and
in a case where it has been determined that both the first focus detection region and the third focus detection region have a periodicity-containing subject, performs focus adjustment by selecting a phase difference that is closest to a phase difference detected in at least one focus detection region of the first focus detection region and the third focus detection region, among a phase difference detected in the second focus detection region or the fourth focus detection region corresponding to at least one of the first focus detection region and the third focus detection region.

* * * * *